(12) United States Patent
Szlam

(10) Patent No.: US 7,324,528 B2
(45) Date of Patent: *Jan. 29, 2008

(54) REMOTE ACCESS, EMULATION, AND CONTROL OF OFFICE EQUIPMENT

(75) Inventor: Aleksander Szlam, Alpharetta, GA (US)

(73) Assignee: Aspect Software, Inc., Chelmsford, MA (US)

( * ) Notice: Subject to any disclaimer, the term of this patent is extended or adjusted under 35 U.S.C. 154(b) by 702 days.

This patent is subject to a terminal disclaimer.

(21) Appl. No.: 10/059,872

(22) Filed: Jan. 29, 2002

(65) Prior Publication Data
US 2002/0181398 A1     Dec. 5, 2002

Related U.S. Application Data

(63) Continuation of application No. 08/977,412, filed on Nov. 24, 1997, now Pat. No. 6,359,892.

(60) Provisional application No. 60/064,251, filed on Nov. 4, 1997.

(51) Int. Cl.
*H04L 12/28* (2006.01)

(52) U.S. Cl. .................. 370/401; 370/465; 709/217; 709/227

(58) Field of Classification Search ............ 370/230, 370/359, 389, 401, 419, 458; 379/67.1, 74, 379/77, 90.01, 93.01, 93.02, 100.08, 100.12, 379/100.13, 102.01–10, 102.07, 201.02

See application file for complete search history.

(56) References Cited

U.S. PATENT DOCUMENTS 5,491,796 A * 2/1996 Wanderer et al. .......... 709/224
5,555,179 A 9/1996 Koyama ...................... 700/95
5,598,536 A * 1/1997 Slaughter et al. .......... 709/219

(Continued)

FOREIGN PATENT DOCUMENTS

EP     0-880-255     11/1998

(Continued)

OTHER PUBLICATIONS

International Search Report—for PCT/US 98/23131, Dated Mar. 8, 1999.

*Primary Examiner*—Chi Pham
*Assistant Examiner*—Phuc Tran
(74) *Attorney, Agent, or Firm*—Bourque and Associates

(57) ABSTRACT

A business has a main office (13) which has a controller (225), a plurality of telephones, a plurality of computers, a PBX and/or an ACD (216), and a plurality of corporate resources (220) such as servers, hosts, applications, databases, routers, gateways, switches, a voicemail system, an e-mail system, and facsimile servers. A user at the main office (13) has access to the various corporate resources and also has a portable communications device (10), such as a laptop computer, with which to place a call to the controller via a communications link (11) such as the Internet, to send user commands to and receive the resultant status, information, or operation, from, the controller, to access any of the corporate resources and data, and to make calls to and receive communications from outside parties (12). In addition, the user may create a personal profile which causes the controller to forward selected communications to him, via the Internet, wherever the user may be. The laptop computer allows the user to operate in the same manner as if the user was actually in his office, including placing, receiving, forwarding, and conferencing telephone calls. As a result, regardless of where the user is located, and regardless of what equipment is actually available at the current location of the user, the user can conduct business using the same devices and features that are available at the user's office.

15 Claims, 10 Drawing Sheets

U.S. PATENT DOCUMENTS

| | | | |
|---|---|---|---|
| 5,764,639 A | 6/1998 | Staples et al. | |
| 5,765,033 A | 6/1998 | Miloslavsky | 709/206 |
| 5,790,548 A | 8/1998 | Sistanizadeh et al. | |
| 5,793,365 A | 8/1998 | Tang et al. | |
| 5,812,819 A * | 9/1998 | Rodwin et al. | 703/23 |
| 5,889,845 A * | 3/1999 | Staples et al. | 379/211.02 |
| 5,926,539 A | 7/1999 | Shtivelman | 379/266.01 |
| 5,946,387 A | 8/1999 | Miloslavsky | 379/265.12 |
| 5,953,332 A | 9/1999 | Miloslavsky | 370/352 |
| 5,953,405 A | 9/1999 | Miloslavsky | 379/265.01 |
| 5,966,130 A * | 10/1999 | Benman, Jr. | 345/418 |
| 6,002,760 A | 12/1999 | Gisby | 379/266.01 |
| 6,021,428 A | 2/2000 | Miloslavsky | 709/206 |
| 6,044,145 A | 3/2000 | Kelly et al. | 379/265.02 |
| 6,044,368 A | 3/2000 | Powers | 707/2 |
| 6,067,357 A | 5/2000 | Kishinsky et al. | 379/265.02 |
| 6,108,711 A | 8/2000 | Beck et al. | 709/242 |
| 6,122,255 A | 9/2000 | Bartholomew et al. | |
| 6,134,591 A * | 10/2000 | Nickles | 709/229 |
| 6,138,139 A | 10/2000 | Beck et al. | 709/202 |
| 6,167,395 A | 12/2000 | Beck et al. | 707/3 |
| 6,170,011 B1 | 1/2001 | Macleod Beck et al. | 709/224 |
| 6,175,563 B1 | 1/2001 | Miloslavsky | 370/352 |
| 6,175,564 B1 | 1/2001 | Miloslavsky | 370/352 |
| 6,185,292 B1 | 2/2001 | Miloslavsky | 379/265.01 |
| 6,253,369 B1 * | 6/2001 | Cloud et al. | 717/136 |
| 6,345,305 B1 | 2/2002 | Beck et al. | 709/242 |
| 6,373,836 B1 | 4/2002 | Deryugin et al. | 370/352 |
| 6,389,007 B1 | 5/2002 | Shenkman et al. | 370/352 |
| 6,393,015 B1 | 5/2002 | Shtivelman | 370/352 |
| 6,608,637 B1 * | 8/2003 | Beaton et al. | 715/762 |
| 6,732,156 B2 | 5/2004 | Miloslavsky | 709/206 |

FOREIGN PATENT DOCUMENTS

| | | |
|---|---|---|
| WO | WO-96/31044 | 10/1996 |
| WO | WO-97/18662 | 5/1997 |
| WO | WO-97/38518 | 10/1997 |

* cited by examiner

REMOTE ACCESS, EMULATION, AND CONTROL OF OFFICE EQUIPMENT

RELATED APPLICATIONS

This is a continuation of U.S. patent application Ser. No. 08/977412 filed Nov. 24, 1997 now U.S. Pat. No. 6,359,892, which claims the priority of U.S. Provisional Patent Application Serial No. 60/064251 filed Nov. 4, 1997.

TECHNICAL FIELD

This invention is related to remote access of devices and more particularly describes a method and an apparatus for accessing the convenience, features and services of known office devices from a remote location.

BACKGROUND OF THE INVENTION

Typically, a person performs most efficiently and most comfortably when working in a familiar environment. For example, office equipment or a particular office device, such as a digital telephone, an office desktop (i.e., a Personal Computer), or a facsimile machine, may provide a plethora of features. Knowledge of the particular commands required to access those features and operate that equipment or device may be obtained, in some cases, only after attending an initial training session and using the equipment or device for several days, or even several weeks. Once that knowledge has been obtained, a person is comfortable and efficient with that equipment or device.

However, on occasion, a person may have to use different office equipment or devices, hereinafter collectively referred to as devices. This may occur because the person has moved to another job, or is on the road at a hotel or a remote office, or the employer has obtained newer equipment, or the employer has obtained temporary replacement equipment, or the employer uses different equipment in other areas of the office or even side-by-side in the same office. When confronted with the different device, the efficiency of that person will drop because that person must take the time to learn how to use that different device. Further, that person will not initially be comfortable with using that different device. If the features of that different device are very different than the devices that the person is familiar with, that person may experience frustration, which further reduces efficiency and job performance. In extreme cases, such as where the instructions for operating the equipment are in a language that the person does not understand, then the person may not be able to perform a job function at all.

Using an unfamiliar, unsecured device or set can also adversely affect safety and security where the remote person needs to transmit or receive information regarding the safe use of a machine or a chemical, and can adversely affect the financial success of a person or an employer, such as where the person needs to transmit or receive information or contact another persons regarding business or making an offer to supply or purchase services or material. Additionally, costs associated with processing internal (intra-enterprise) telephone calls, e-mails, faxes, and other information sharing and exchanging, are much lower than costs associated with processing such information externally. In addition, a person in an office, especially a person in management, will have access to financial and other information via servers in accounting, personnel, production, shipping, etc. Thus, information and communication are essential to safety and prosperity.

The traveling person will typically be exposed to many different environments and devices, in hotels, in remote offices, and while using commercial or private transportation. Operating procedures and commands cannot simply provide a standard, permanent set of procedures and commands because devices are constantly being improved to provide additional features, and because a permanent set of procedures and commands would have to be designed for a complex device or set, possibly contemplating features that are not even in existence, would generally be unnecessarily complex or cumbersome for a similar, simpler device, or a device which provided fewer features.

Consider a typical office environment where the user can send and receive e-mails and faxes, or can instruct someone else to send faxes, all using familiar equipment, access servers for information, etc. The user can place and receive telephone calls using a familiar office telephone and the familiar office voicemail system. The user can conference calls, transfer calls, put calls on hold, speed dial business associates, business contacts, friends, family, etc., all from the office telephone set. If the office has a data network, and possibly Internet services, the user may also be able to store, retrieve, transfer, modify, manipulate, etc., different types of information, such as audio, video, facsimile, text, data, spreadsheets, drawings, etc., by using a familiar computer connected to a familiar set of servers or hosts within a corporate enterprise.

However, the user may not be at this office. The user may be traveling on business, or pleasure, and be at another location, for example, a hotel in a country other than the United States, or even be on an airplane. The hotel would provide a telephone in the user's room for the user's convenience and, to call the office, the user would use the room telephone to dial the hotel long distance access code, the country code, and the office telephone number. This call would then be routed by appropriate telephone companies and long distance carriers to the PBX, ACD, CENTREX, etc., at the destination office, which would then route the call to the specified office telephone.

At this point, the only new information that the user has needed to know are the access code for a long distance call, and the country code. However, assume now that the user wishes to add another party, that is, the user wishes to create a conference call. Is the hotel telephony system configured to support a conference call? If not, the user must depend upon the called party to set up the conference call or obtain operator assistance. Further, even if the hotel telephone system is configured to support a conference call, what are the access codes that must be entered to instruct the hotel telephone system to create a conference call? What if the user is in Japan, and the two parties that the user wishes to add to the conference call are in England and The United States? In this case, even if the user can determine the necessary access codes to create a conference call from the hotel in Japan, the user will be paying for two long distance telephone calls, which results in significantly higher costs.

Consider another case wherein the user wishes to make two separate calls. The user must dial all of the necessary long distance access codes and country code digits for each call. In addition, each call has its own associated charges for setting up the call, and possibly a minimum charge for each call. Again, the user will be paying for two long distance telephone calls.

Consider still another case wherein the user wishes to obtain certain information from the office, possibly in order to send that information to another person. The user may call the office and ask someone to obtain the information and send it to the specified person. But what if, because of the time difference, there is no one in the office? If the user has a portable computer the user might be able to call the office data network and retrieve the document from a server, but then what? The user would have the document on the portable computer, but may not have a way to print the document or to send it.

Also, even if the user can place telephone calls, the problem is only half solved. The user may wish to receive telephone calls as well. Of course, the user could give his itinerary (locations, telephone numbers, and dates), to certain persons, who would know how to contact the user, but what if a calling party called at lunch, or on a weekend. There would be no one to provide the information to the calling party. The user could give his itinerary to his business contacts, but what if an unexpected business opportunity or problem arose and the user had not provided his itinerary to that business contact. The user could, in theory, activate call forwarding and forward all calls to the user's remote location. But some telephone systems and some offices do not allow external call forwarding, especially if the forwarded destination is long distance. Plus, if long distance forwarding is permitted, each forwarded call incurs a long distance charge which the user or his company must pay, even if the incoming call is unwanted or is a wrong number.

Therefore, the problem to be solved is how to provide a user with the ability to remotely access and use all the services and/or devices available at the user's office and/or the corporate enterprise, or at the user's home, regardless of where the user is currently located, and regardless of what equipment or devices are present at the remote location, just as though the user was still in his/her local office or at home.

Another aspect of the problem to be solved is how to provide a user with the ability to use the features available on the equipment and devices at the user's office, regardless of where the user is currently located, and regardless of what equipment or devices are present at the location of the user.

SUMMARY OF THE INVENTION

The present invention provides a method and an apparatus whereby a user can remotely access the devices or sets (equipment), services and applications at the user's office, regardless of where the user is currently located, and regardless of what devices are present at the current location of the user.

The present invention provides a method and an apparatus whereby a user can use the features available on the devices at the user's office, regardless of where the user is currently located, and regardless of what devices the user has at the present location of the user.

The present invention further provides the user with the same procedures, the same "look and feel" of his office environment, the same pre-programmed features of his office telephone, the same access to the enterprise-wide corporate information, etc., all from remote locations, but just as if the user was at his desk/office.

The present invention additionally allows for remote services to be provided at contained or fixed costs, similar to the costs incurred as if such services were accessed from the office. The invention also allows the traveling user to also communicate with business contacts, friends and family, as if the user was in his office making a local call.

The present invention also provides a versatile telephone set, where the features and functions are programmable using a computing device, such as a portable communications device, personal computer, a network computer, a JAVA station, a palm-size (handheld) computer, frequently referred to as a Personal Digital Assistant (PDA), etc.

The present invention allows a user at a first location, such as a remote location, to access devices at a second location, such as a base location. The first location may be any remote location, such as a remote office, a hotel, home, an airplane, the beach, a boat, a car, etc. The second location may be any base location, such as the main office, a branch office, a home, etc. The steps, which are executed by a portable communications device used by the user, include presenting a plurality of representations, where each of the representations corresponds to a predetermined one of the devices at the second location, accepting a user selection of a representation, establishing a communications link with the second location, presenting an image or images of devices, applications, servers, etc., represented by the representation which was selected, accepting user selection of a device function represented by the image, sending the user selection of the device function to the second location, receiving a result from the second location, the result representing a response of the selected device to the user selection of the device function, and updating the image to display the result to the user.

The present invention also allows the user at the first location to conduct business by using telephone facilities available at the second location. In this case the portable communications device presents a plurality of representations, where at least one of the representations corresponds to a telephone set available at the second location, accepts a user selection of the representation corresponding to the telephone set, establishes a communications link with the second location, presents an image of the telephone set, accepts user selection of a telephone set function represented by the image, sends the user selection of the telephone set function to the second location, receives a result from the second location, the result representing a response of the telephone facilities to the user selection of the device function, and updates the image to display the result to the user.

The present invention also allows the user at the first location to conduct business by using telephone facilities available at the second location. In this case the portable communications device presents a plurality of representations, where at least one of the representations corresponds to a telephone set available at the second location, accepts a user selection of the representation corresponding to the telephone set, establishes a communications link with the second location, presents an image of the telephone set, accepts user selection of a first telephone set function represented on the image, the first telephone set function being to dial a party at a telephone number specified by the user, sends the user selection of the telephone set function and/or the specified telephone number to the second location to cause the second location to place a call to the called party, connects the user and the called party as a voice connection through the second location, accepts user selection of a second telephone set function represented on the image, the second telephone set function being to terminate the voice connection, sends the user selection of the second telephone set function to the second location to cause the second location to terminate the call to the called party, terminates the voice connection through the second location, and monitors for additional user selections.

The present invention also allows the user at the first location to conduct business by using devices, servers and applications available at the second location. In this case the portable communications device presents a plurality of representations, where at least one of the representations corresponds to the device, server or application available at the second location, accepts a user selection of the representation corresponding to the device, server or application, establishes a communications link with the second location, presents an image of the device, server or application, accepts user selection of a first device, server or application function represented on the image, sends the user selection of the device, server or application function to the second location to cause the second location to access the device, server or application, sends information regarding the device, server or application to the user, accepts user selection of a function represented on the image, sends the user selection of the function to the second location to cause the second location to execute the function, and monitors for additional user selections.

The present invention also provides for duplicating an office environment by allowing a user at a first location to access multiple devices which are available to the user when the user is at a second location. In this case the portable communications device presents a plurality of representations, where each of the representations corresponds to a predetermined one of the devices available to the user at the second location and at least one of the representations corresponds to a telephone set available at the second location, accepts a user selection of a first representation, establishes a communications link with the second location, presents an image of a device represented by the representation which was selected, accepts user selection of a device function represented on the image, sends the user selection of the device function to the second location, receives a result from the second location, the result representing a response of the selected device to the user selection of the device function, updates the image to display the result to the user, accepts a user selection of the representation corresponding to the telephone set, accepts user selection of a first telephone set function represented on the image, the first telephone set function being to dial a called party at a telephone number specified by the user, sends the user selection of the telephone set function and the specified telephone number to the second location to cause the second location to place a call to the called party, receives a result from the second location, the result representing a response of the telephone facilities to the user selection of the device function, updates the image to display the result to the user, and connecting the user and the called party as a voice connection through the second location and the communications link, the communications link being used for communications both with the second location and with the called party.

The present invention also provides for duplicating an office environment by allowing a user having a portable communications device at a first location to conduct business by using telephone facilities available at a second location so that the user can receive incoming calls directed to his office telephone number. In this case the portable communications device accepts an incoming call on a communications link from the second location, accepting an identity for a calling party who has placed an incoming call to the user, the incoming call being to the telephone number for the user at the second location, presenting the identity for the calling party, accepting an instruction from the user as to the treatment of the incoming call, sending the instruction to the second location, handling the incoming call in accordance with the instruction, and monitoring for additional instructions from the user.

The present invention also provides for operation of equipment at the second location to provide the above benefits to the user. Generally, a controller, or a plurality of other devices, performs the steps necessary. For example, the controller allows a calling party to access office devices and equipment, even when the user is at a second location, by accepting an incoming call from the user, receiving a user selection of a device, receiving a user selection of a function of the device, sending the user selection of the function to the device, receiving a response from the device to the device function, and sending the response to the user.

The controller also allows the user who has a portable communications device at a first location to conduct business by using telephone facilities available at a second location, including the handling of incoming calls to the user at the user's office telephone number. The controller performs the steps of accepting an incoming call from a calling party, the incoming call being to a telephone number for the user at the second location, determining an identity for the calling party, determining the first location, if the calling party is a predetermined person, or if the first location is a predetermined location, then placing a call to the portable communications device and sending the identity for the calling party to the portable communications device, accepting an instruction from the portable communications device as to the treatment of the incoming call, handling the incoming call in accordance with the instruction, and monitoring for additional instructions from the portable communications device.

The present invention also provides for simultaneous access to office information, local area networks, data, servers, applications, etc., while voice communications are present. The user may access the information, local area networks, data, servers, applications, etc., as if the user was in the office.

In the above inventions, the communications link may be any means of transferring data, such as telephone lines, satellite or cellular links, or the Internet.

Other objects, features, and advantages of the present inventions will become apparent upon reading the following description of the preferred embodiment, when taken in conjunction with the drawings and the claims.

DETAILED DESCRIPTION OF THE INVENTION

Figure 1:
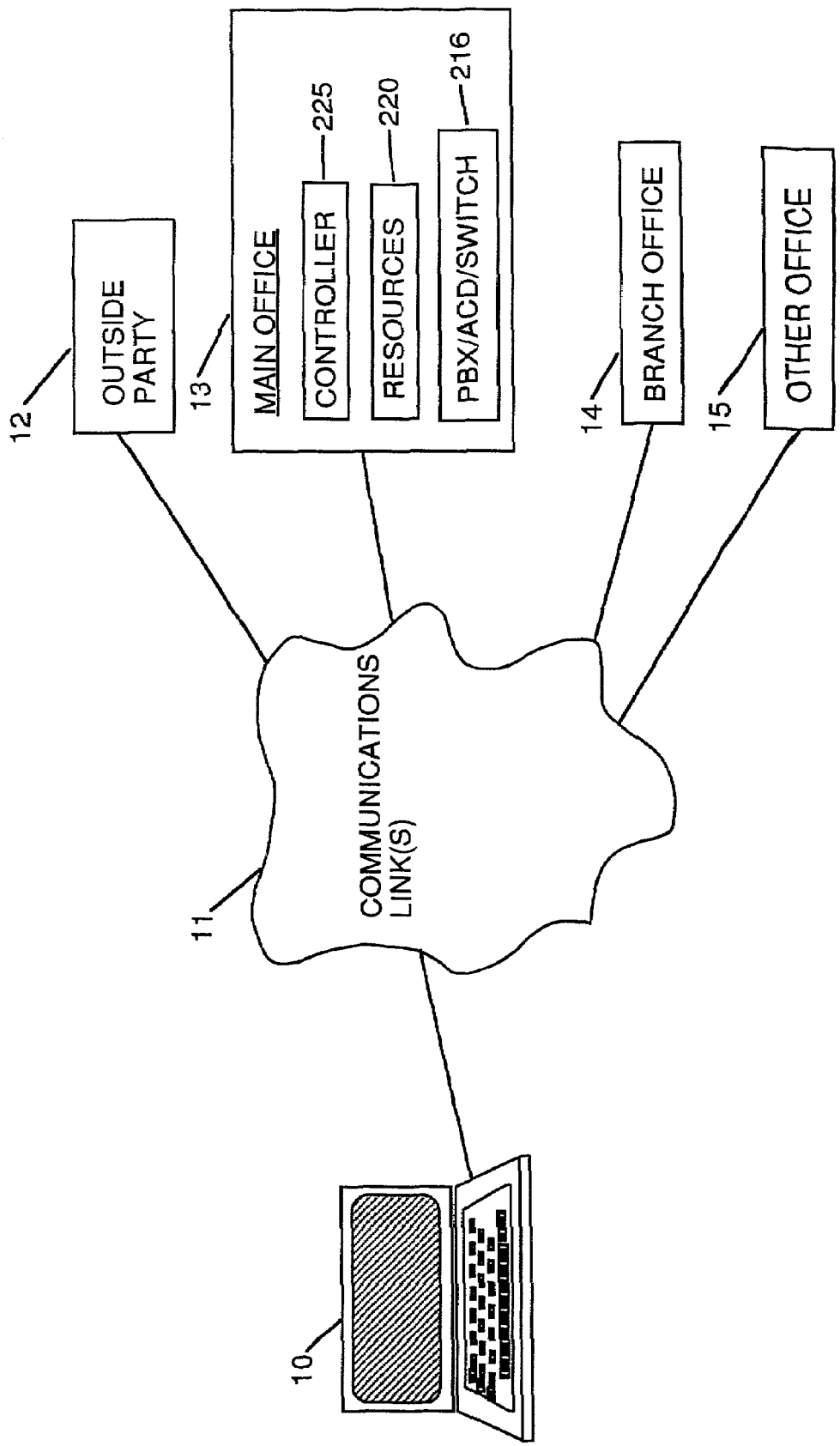
FIG. 1 is an illustration of a general environment of the preferred embodiment of the present invention.

FIG. 1 is an illustration of a general environment of the preferred embodiment of the present invention. The user has a portable communications device 10. The portable communications device 10 is connected by a communications link 11 to one or more other points, such to as an outside party 12, who may be a calling party or a called party, to a main office 13, to one or more branch offices 14, which may have the same resources as or different resources than the main office 13, and to one or more other offices 15, which are distant from the main office 13, which may have the same resources as or different resources than the main office 13, and which may be designed for a user who communicates using a different language than the primary language used at the main office 13. The main office 13 which has a controller 225, a plurality of telephones, a plurality of computers, a PBX and/or an ACD 216, and a plurality of other corporate resources 220 such as servers, hosts, applications, databases, webs, routers, gateways, switches, a voicemail system, an e-mail system, and facsimile servers. Depending upon the distance between the first location, where the user is located, and the second location, where the resource is located, the communications link 11 may be a global communications link and include such infrastructure as telephone networks, satellites, cellular links, etc.

The present invention allows the user at a remote location, such as a hotel in a different country, to use his portable communications device 10 to access the persons, services, information and devices at any of these points, regardless of where the user is located, and without the user having to know the peculiarities of dialing from the remote location or the telephone equipment at the remote location. In the preferred embodiment, the portable communications device 10 is a portable or laptop computer with a fax-modem, includes an internal microphone and speaker, and has a connector for connecting an external microphone and speaker, such as a handset. The fax-modem, along with application software in the portable communications device 10, provides for facsimile, voice, and data transmission and reception. It should be understood that "data" includes any information that may be sent digitally, such as video, pictures, sounds, music, business records, charts, graphs, etc. It should also be understood that voice may be transferred either conventionally, as an analog signal, or digitally, such as by a voice over data protocol, the voice over Internet Protocol, or other protocols. In the preferred embodiment, the fax-modem provides multi-media support and is an internal or integral modem, but an external modem or plug-in modem card may also be used. Also, the modem is preferably used with software that provides for simultaneous voice and data transmission.

Figure 2A:
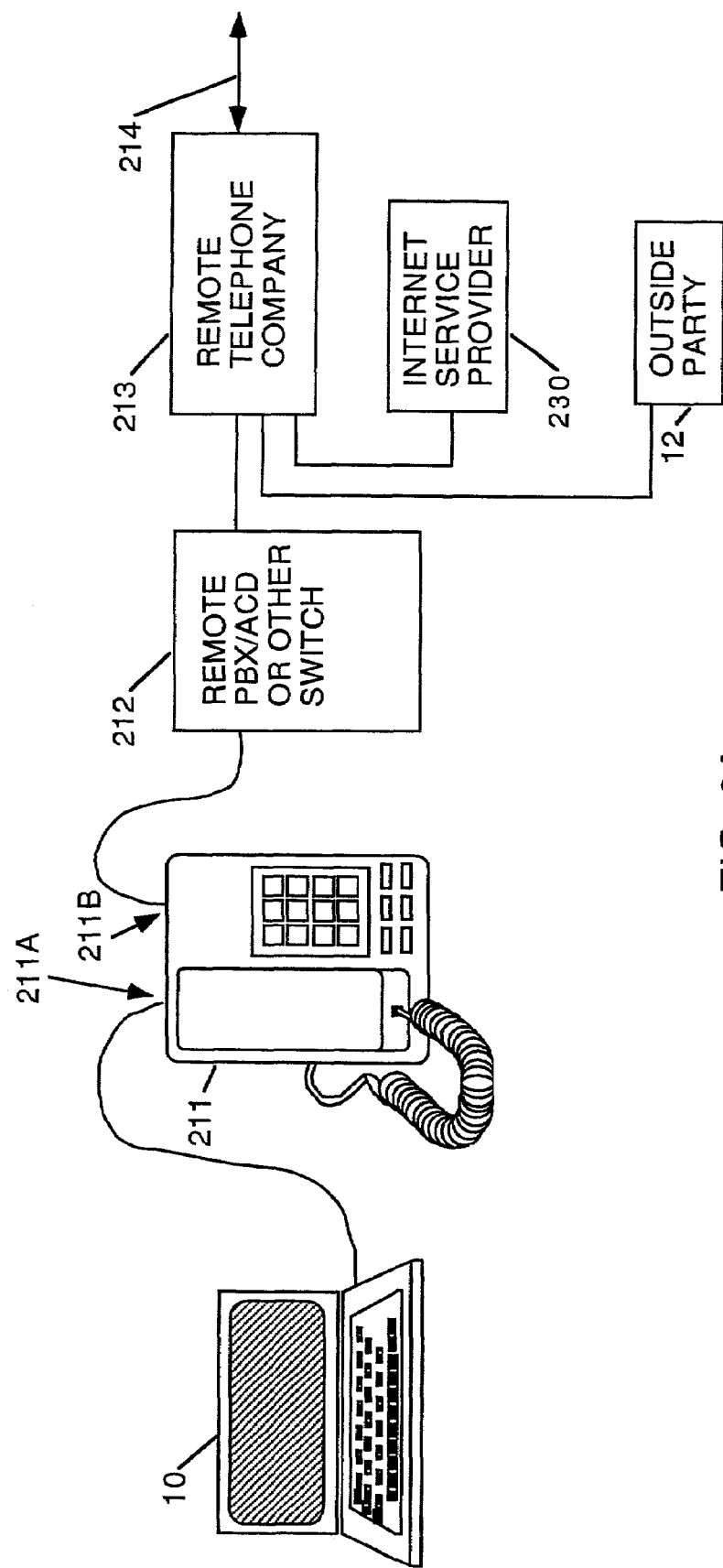
FIGS. 2A and 2B are an illustration of a typical environment for the preferred embodiment of the present invention.
Figure 2B:
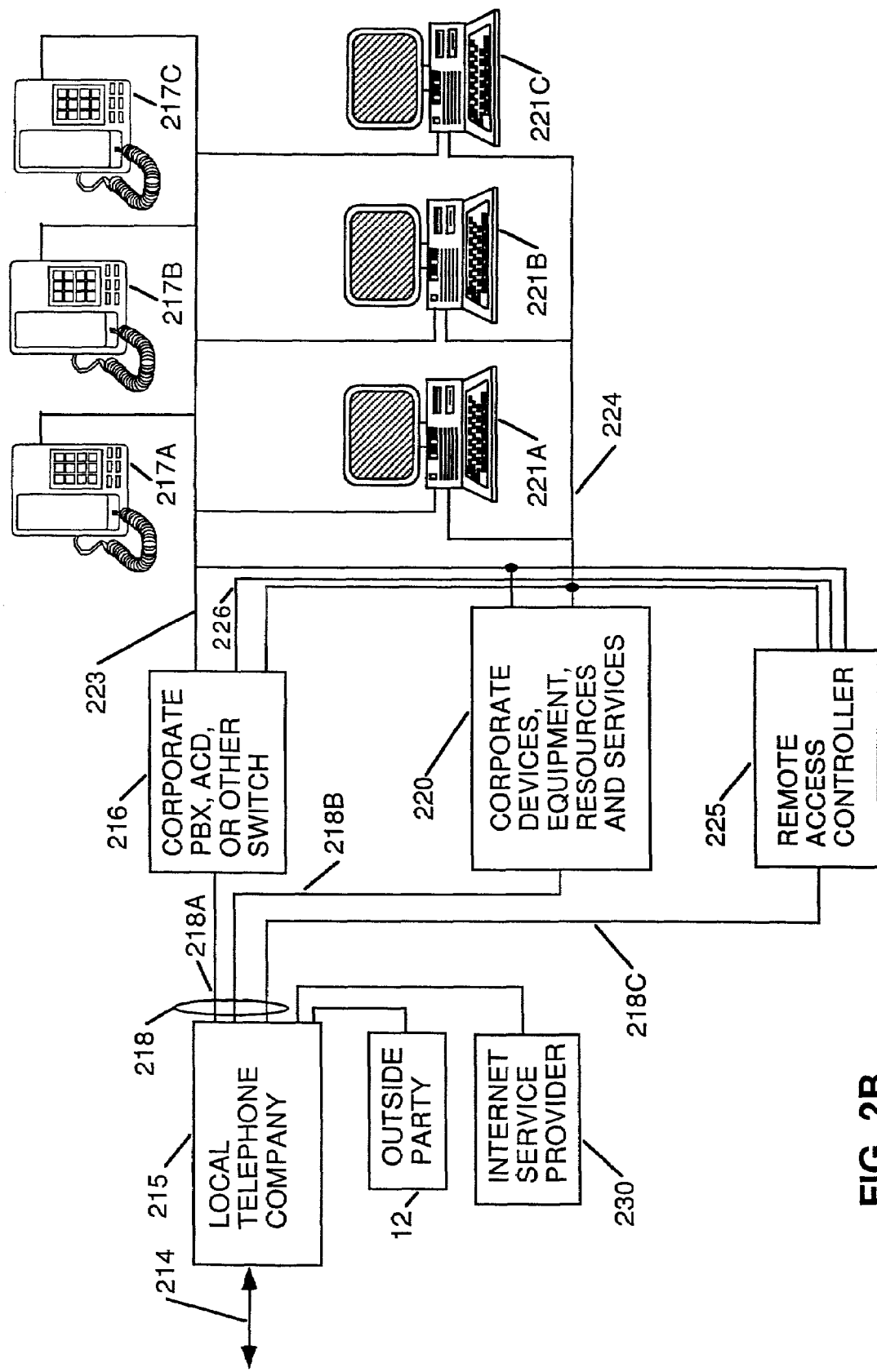

FIGS. 2A and 2B are an illustration of a typical environment for the preferred embodiment of the present invention. Assume that the user works in the main office 13 located in Atlanta, Ga., USA, and that the user has a portable communications device 10.

The main office 13 has a plurality of electronic telephones 217, a plurality of desktop computers or computer terminals or laptop computers 221, a PBX or ACD or other telephone system or switch 216, and various corporate devices, equipment, resources, and services 220. Some, but not all, examples of the various corporate devices, equipment, resources, and services 220 are hosts, mainframes, routers, data switches, modems in a modem pool, database servers, information servers, applications servers, fax servers, e-mail servers, web site servers, videoconferencing systems, voice-mail systems and other servers. The computers 221 are preferably connected by a LAN, an intranet, and/or a wide area network, shown generally as 224, and preferably each include a multimedia processing application or software package, or simply a standards-based Internet/Intranet browser such as the Netscape Navigator™ or the Microsoft Explorer™. The application or software may be stored in the computers 221 or may be stored in a server 220 and accessed by a computer 221 when needed (server-based software).

Devices 217, 220, and 221 are connected to the PBX 216 via a plurality of telephone lines, which are shown generally and collectively as 223. However, it should be appreciated that not all of the devices 217, 220, and 221 need be connected to the PBX 216. Some of these devices 217, 220, and 221 may have no provision for connection to the PBX 216. The device 216 is not limited to a PBX but may be an ACD, another telephone switch, a voice/data intelligent router, or another telephone or communications switching system, including the central office or telephone company switch, or a combination thereof, all of which are generally referred to herein for convenience as a PBX or as a telephone switch 216. In the example shown the PBX 216 is connected to the local telephone company 215, which has communication links 214 for communication with points which are outside of the immediate office area. However, it should be appreciated that PBX 216 is an office option, and part or all of the functionality of a PBX may be performed by the telephone company central office equipment or other infrastructure.

In addition, devices 216, 220, and 221 are also connected to each other via communications lines collectively shown as 224. The data lines 224 may be, for example, part of a local area network (LAN), a wide area network, intranet, or other company networking scheme, and may be connected to the other parts of such a network by servers, gateways, routers, and switches 220, or by PBX 216 where the connection is to be made via a connection 218A with the local telephone company 215. Connections between the main office 13 and the local telephone company 215 are shown generally as lines 218.

The communication links 11, 214 may be provided by the local telephone company 215 or may be provided by using other communications companies and facilities, either in conjunction with the local telephone company 215 or independent of the local telephone company 215, such as cellular telephone service, satellite link service, private carriers, the Internet via an Internet Services Provider (ISP), twoway cable service, asynchronous transmission mode (ATM) lines, etc. Various protocols are used on these lines, such as, ATM, Frame Relay, ISDN, ADSL, SS7. Generally, the lines 218 and local telephone company 215 will constitute at least a part of the communications link 11. The communications links used and the protocols used on the communications links are not critical.

In this main office environment, the user can send and receive faxes and e-mail, exchange electronic documents, place and receive telephone calls, and store, retrieve, transfer, modify, manipulate, etc., different types of information on servers, such as audio, video, facsimile, text, data, spreadsheets, drawings, etc., as mentioned above. The user may use a computer 221 or his portable communications device 10 to perform the desired work in the office, or may use his portable communications device 10 both in the office and away from the office.

A remote access controller 225 is connected to the PBX 216 via lines 223, and also connected to the communications lines 224. This controller 225 may be, for example, a server, an Internet gateway, a computer-telephony integration (CTI) server, a computer programmed to serve as a remote access controller, etc. The controller 225 is preferably connected directly to the telephone company via one or more telephone lines 218C, at least one of which lines 218C is preferably a direct line to a local Internet Service Provider (ISP) 230 which provides an Internet communications link. Preferably, the controller 225 is permanently "logged-on" to the local ISP 230. Thus, the controller 225 can directly and immediately receive incoming communications over the Internet via the ISP 230, and can directly and immediately initiate communications over the Internet, rather than having to communicate via the PBX 216. Therefore, via the Internet, the controller 225 may connect with, and exchange information, data, and instructions with, the portable communications device 10. The connection between the controller 225 and the portable communications device 10 is preferably Internet-based for both voice and data communications.

The controller 225 also preferably has, or has access to, the modem pool 220, which may include one or more voice/data modems, and which is connected to the telephone lines 223. This allows the controller 225 to connect with, and to exchange information, data, and instructions with, the portable communications device 10. Although the connection between the controller 225 and the portable communications device 10 is preferably Internet-based, other communications links 11 may also be used or may be necessary, such as when the user is in a location where Internet service is not conveniently available. In this case, the portable communications device 10 can communicate with the controller 225 via the modem pool 220.

The controller 225, via an associated modem, or via an associated Internet Protocol (IP) voice/data separator, can separate the voice from the data, send the voice portion to the PBX via lines 223 for further routing and connection, and operate upon the data portion. Alternatively, these devices may be located in or associated with the PBX 216, in which case the PBX 216 will coordinate and control the separation of the voice from the data, the transmission of the data portion to the controller 225, and the routing or connection of the voice portion as specified by the calling party. The controller 225 may also have other modems or direct trunks for communicating with other equipment which is responsive to DTMF instructions sent over lines 218 and 223. The controller 225 also preferably has a CTI software application. This allows the controller 225 to communicate with the PBXs 212, 216, and with other devices connected to the lines 223, so that the controller 225 can receive commands from, and send commands to, the PBXs 212, 216 and devices 10, 213, 215, 217, 221, and 230. This enables the controller 225 to provide or command desired telephony functions, such as conferencing, placing on hold, transferring, calling, answering, and other functions which are available via the PBXs 212, 216, just as if the commands or functions were issued by or implemented by a local telephone set 217 directly connected to the PBX 216. The controller 225 can receive commands from the remote communications device 10, convert these commands into CTI commands, and send the CTI commands to the appropriate device, such as the PBX 216. Likewise, the controller 225 can receive CTI status information from devices, convert this information into the desired format, and send it to the remote communications device 10 for display or action, as appropriate. A variety of CTI-like protocols or interfaces may be used, such as Telephony Application Programming Interface (TAPI™) by Microsoft, Telephony Server Application Programming Interface (TSAPI) by Novell, IBM Callpath, or Dialogic's CTCONNECT™, etc. Some of these protocols may be communicated via ISDN lines, rather than via conventional data lines.

The controller 225 also has provision for receiving instructions sent over the lines 224 from local computers/desktop devices 221 which issue commands, and for receiving instructions devices in the branch offices 14.

Other methods and devices, such as routers and gateways, may also be used to combine voice and data, send voice and data over a single telephone line, and separate voice and data, especially where ISDN or Internet communications paths are available.

Further, although the present invention describes most activities as being done by or at the command of the controller 225, it should be appreciated that one, some, or all of the functions of the controller 225 may be incorporated into the PBX 216 and/or the other devices 220, so that the portable communications device 10 communicates via the PBX 216 and/or the other devices 220 rather than communicating via the controller 225. The PBX 216 and/or the other devices 220 act on the commands from the portable communications device 10, regardless of whether the commands are provided directly or via the controller 225, and the PBX 216 and/or the other devices 220 also send back status information.

The present invention may be installed as part of new office equipment which is designed to perform the functions described herein, or may be installed as a retrofit to existing office equipment. As a retrofit, the present invention is preferably implemented via the remote access controller 225 and by adding controllers, routers, 220, 225, etc., so as to allow the functions described herein to be performed. However, the present invention may also be implemented as modifications to the PBX 216, to an existing server or device 220, or to another existing device which has the ability to convert and relay commands and responses, such as a computer equipped with telephone lines, and information communications interfaces.

Most homes, offices, and hotels have analog telephone lines and a telephone set to which the user can connect his communication device 10. However, digital telephone lines, such as ISDN, T1, and E1 are available from the telephone companies. Further, cable, such as cable TV, can provide an even higher speed communications link 11. ISDN, T1, E1, and cable communications links 11 to a home or a hotel room are well within the state of the art. Cost is the only limitation. Further, the user may have personal access to other communications links 11, such as cellular service, satellite, personal communications service (PCS), or other wireless services. A communications link 11 may, by itself, provide a direct connection to the controller 225 or several different independent communications links may combine to provide the desired connection to the controller 225. Thus, even though the present invention is described as using a telephone line and being connected to the office via an Internet link, it should be understood that this is simply a choice based upon the present availability and cost of different types of communications links 11, which is a factor controlled by economics, not by technology. Therefore, the present invention should be understood as being used with any type of communications link 11, and not limited to telephone lines and Internet links.

Assume now that the user is traveling and is in a hotel room and that the hotel room has a telephone set 211 which is connected to a remote PBX/ACD or other telephone system or switch 212 of the hotel. The hotel PBX 212 is connected to a remote telephone company 213. Items 212 and 213 are "remote" in that they are not located locally with respect to the main office 13. They are generally "local" to the user in the hotel. In the preferred environment of the present invention, the telephone 211 has two ports, 211A and 211B. Port 211B is a telephone port that connects the telephone set 211 to the PBX 212. Port 211A allows a computer, such as a portable communications device 10, to place and receive telephone calls and to transfer data over the telephone line via the PBX 212. Such telephone sets 211 are now commercially available. However, many hotels, offices, and residences use telephone sets which have only a single port. If only single port telephones are available then a splitter or coupler may be used. Also, a hotel or office may provide a second telephone outlet, having either the same extension number as the telephone 211 or a different extension number as the telephone 211. In the present invention, the portable communications device 10 is connected to the port 211A of the telephone set 211. The portable communications device 10 could, instead, connect directly to a port, such as an analog or ISDN port, on the PBX 212, or via a wireless connection directly to a remote wireless service provider, such as a cellular PCS. The portable communications device computer 10 is preprogrammed with certain information, described in more detail below.

In accordance with the present invention, the user will plug the portable communications device computer 10 into the data port 211A of telephone set 211.

Figure 3:
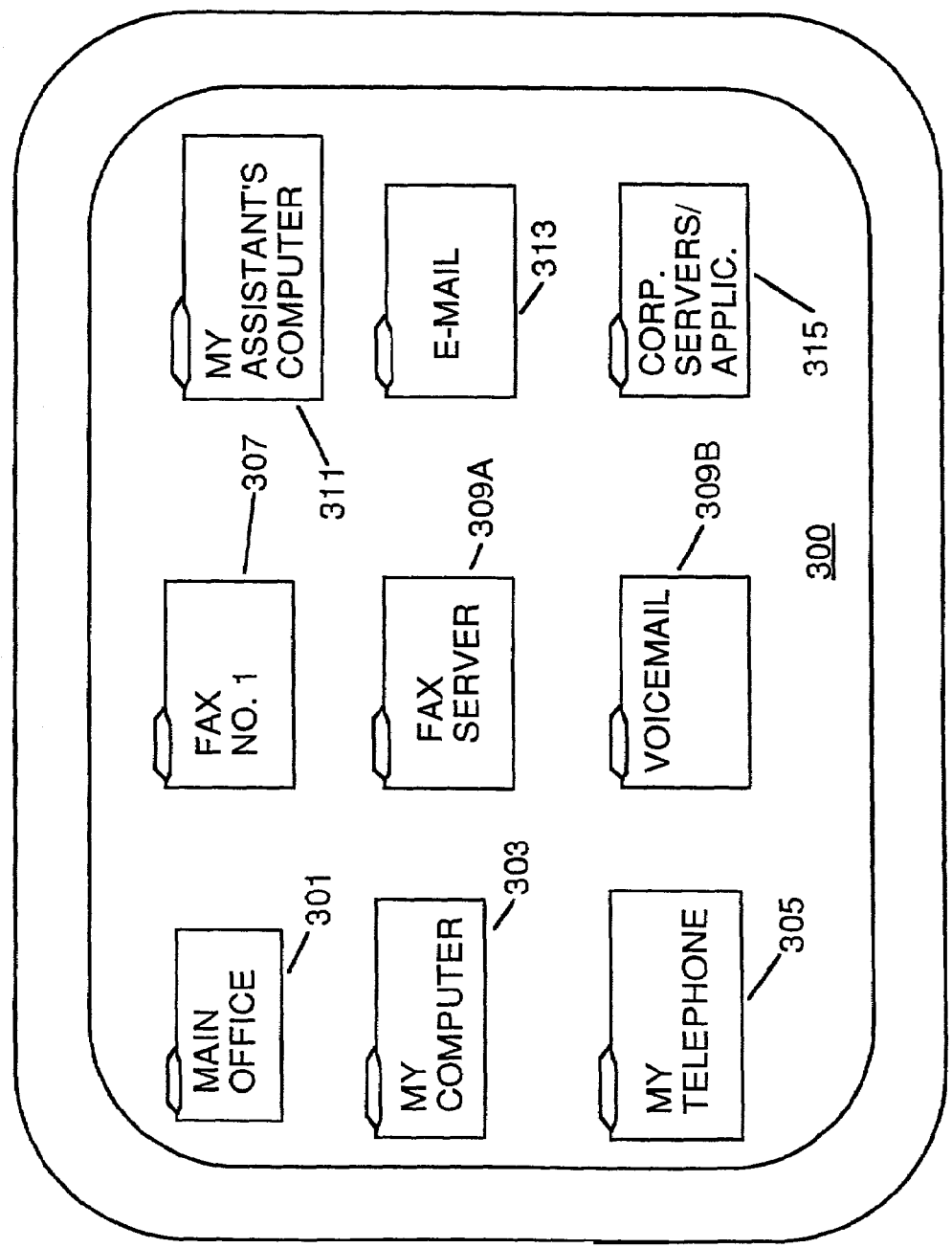
FIG. 3 is an illustration of some folders displayed on the screen of the communications device.

FIG. 3 is an exemplary illustration of some folders displayed on the screen 300 of the portable communications device 10. The Main Office 13 is represented by a folder 301, the user's office computer is represented by folder 303, the user's telephone is represented by folder 305, the facsimile machine, server or service is represented by folders 307, 309A, the voicemail system is represented by folder 309B, an office computer, such as the computer of the user's assistant, is represented by folder 311, the user's e-mail is represented by a folder 313, and corporate servers and applications are represented by a folder 315. It will be appreciated that the folders selected are exemplary only, and that other folders may be used to inform the user what device is available for selection. The size and placement of the folders is for convenience of illustration and is not a limitation. Also, icons or other representations may be used instead of or in addition to folders.

Assume now that the user wishes to call the Main Office 13 or access some equipment or features there. The user selects and opens the "Main Office" folder 301 or selects "Main Office" from a pull-down menu (not shown). The portable communications device 10 then presents a display which prompts the user to provide, enter, or select the information needed to place the call, such as the current location (city, state or country) of the user, the area code in which the user is presently located, the telephone number of the local Internet Service Provider, the necessary hotel access codes and/or dialing information (code to dial a long distance number, code for international access, etc.), etc.

Figure 4:
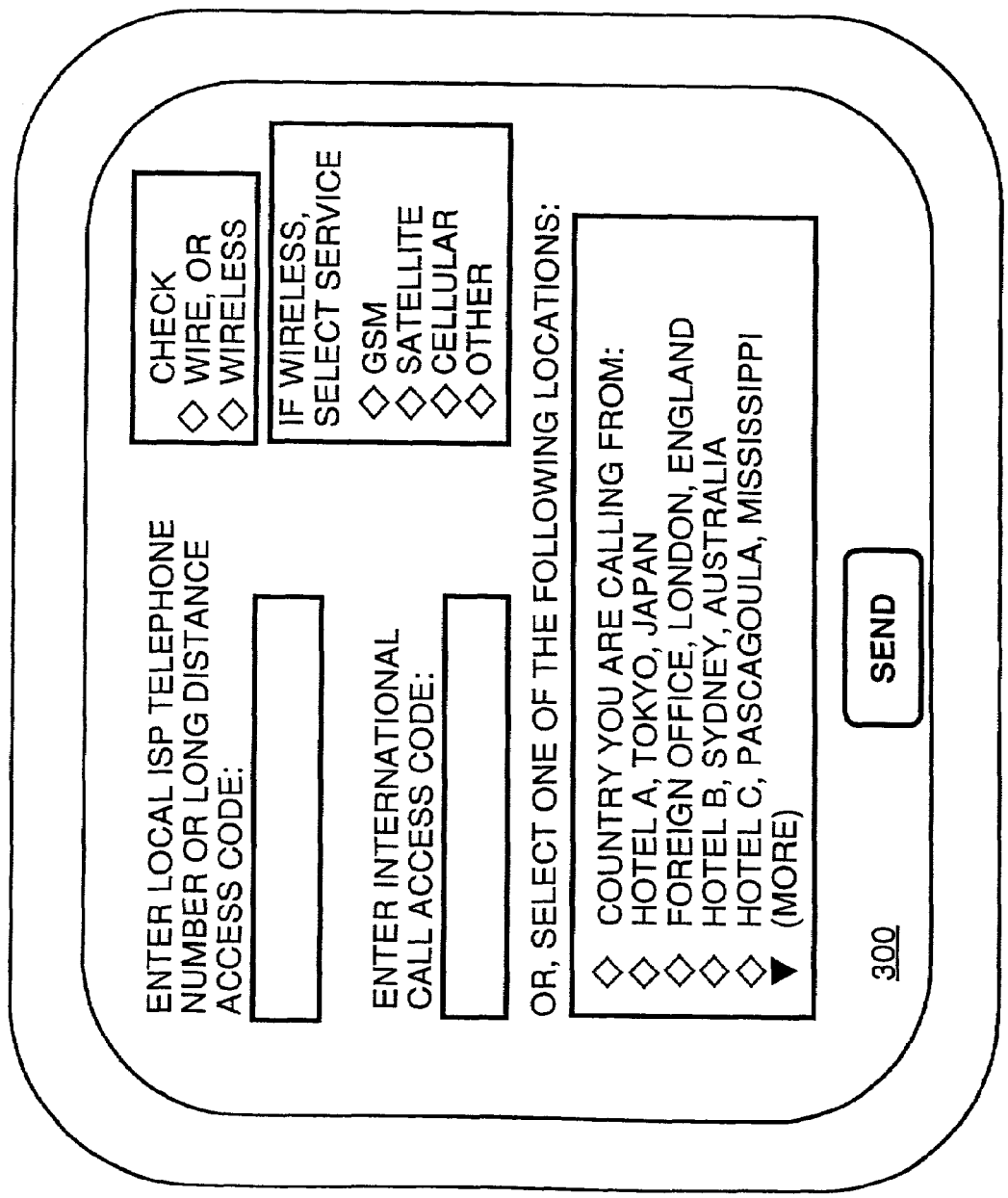
FIG. 4 is an illustration of the display of the communications device when initiating a telephone call.

An exemplary display for the portable communications device 10 is shown in FIG. 4.

The user provides or selects the information and selects "SEND". The portable communications device 10 stores, for future use, the information provided by user. Therefore, if the user has made a call from that location before, or has preprogrammed the dialing information about that location, then the user may simply select that location and select "SEND".

The portable communications device 10 then dials the telephone number for the local ISP or, for controller 225. The portable communications device 10 thereby establishes a connection with the controller 225 via the selected communications link and devices, such as the telephone 211, the switches 212 and 216, the telephone companies 213 and 215, the telephone network 214, the ISPs 230 and the Internet, the global communications link 11, etc.

Login procedures, passwords, and other security measures are used to prevent access to the office devices or information by unauthorized persons. Preferably, a first procedure is used by the controller 225 before allowing the user to access any devices, services, or information. Then, a second procedure is used by each device so that, even if an unauthorized person is able to gain access to the controller 225, that person will not be able to gain access to any other device, service, or information. Some devices are not designed to provide security so, for such devices, the controller 225 or another device, such as a server, will implement the second procedure prior to allowing access to the device.

Assume that the user at the remote location has now established communications with the controller 225 at the main office 13, and that the user wants to place a call using the main office telephone equipment. The user could select a PBX folder (not shown) and type in commands for the PBX 216 to dial the desired number and then to connect the user. However, the user would need to know the exact form of the commands required by the PBX 216 and the meaning of the result codes sent by the PBX 216. These commands and codes could be extremely complex and non-intuitive to the user. In the preferred embodiment, the user selects the folder 305 for the user's telephone set, which causes the GUI representation of the user's office telephone set (as in FIG. 5) to appear on the screen of the device 10.

Once the connection is made, the user is presented with the image of his/her telephone set, so all functions that were previously executed using the physical telephone set are now executed identically, but now via the GUI telephone present on the screen of the device 10. Using the portable communications device 10, the user may then specify a person (John, Mary, my assistant, receptionist, mail clerk, my house, my accountant, my lawyer, etc.) or dial in an extension number or a telephone number. The controller 225 will then instruct the PBX 216 to connect the call as specified. The controller 225 may send instructions to the PBX 216 by DTMF tones via 223, by means of data sent to the PBX 216 via the communications lines 224, or by means of data sent to the PBX 216 on a dedicated control line 226. For example, the call may be routed to the telephone set 217A, or may be routed out of the PBX 216 to the local telephone company 215 to route the call to a number not inside the user's office, such as the user's house.

In the preferred embodiment, the controller 225 remains connected to the call from the user and thus monitors, translates and controls the call from the user. Thus, the user can use the portable communications device 10 to send additional commands, such as "terminate session" (which terminates the call from the user), "terminate call" (which terminates the connection to the specified telephone number or device, but does not terminate the connection from the user to the controller 225), or "change call" (which provides further options for handling the call connected to the specified telephone number or device, but does not terminate the connection from the user).

Thus, when the call connected to the specified telephone number or device is completed (for example, the PBX 216 detects that the called party 12, 217 has hung up, or the user sends "end call" command), the user is still connected to the controller 225. The user can then use the portable communications device 10 to send an instruction to perform another operation, such as to call another person 12, 217, to connect with the voicemail system, to connect with another device 220, 221, etc.

Similarly, the portable communications device 10 can receive incoming calls directed to the local extension of the user. If the controller 225 and the portable communications device 10 are connected and an incoming call occurs for the local extension (for example, 217A) of the user then, if the user has so specified, the controller 225 will send a "ring" signal to the portable communications device 10. If automatic number identification (ANI) or caller ID is available the controller 225 sends, and the local device 10 displays, the telephone number (ANI, caller ID) and name (caller ID) of the calling party 12. For convenience, ANI and caller ID are sometimes collectively referred to as simply ANI. Of course, as explained in U.S. Pat. No. 4,797,911, the ANI or caller ID information may be used by the controller 225 to access a server or database and obtain more information about the caller, such as the caller's address, business, recent orders, payment history, etc. The user then uses the remote device 10 to instruct the controller 225 whether the user wishes to receive the incoming call. If so, then the controller 225 causes the PBX 216 to route the call via the ISP, or other communications link, to the remote device 10, whereby the user can then answer the incoming call. The user can also use the remote device 10 to refuse the incoming call, send the incoming call to another extension or to a mailbox, etc.

Figure 5:
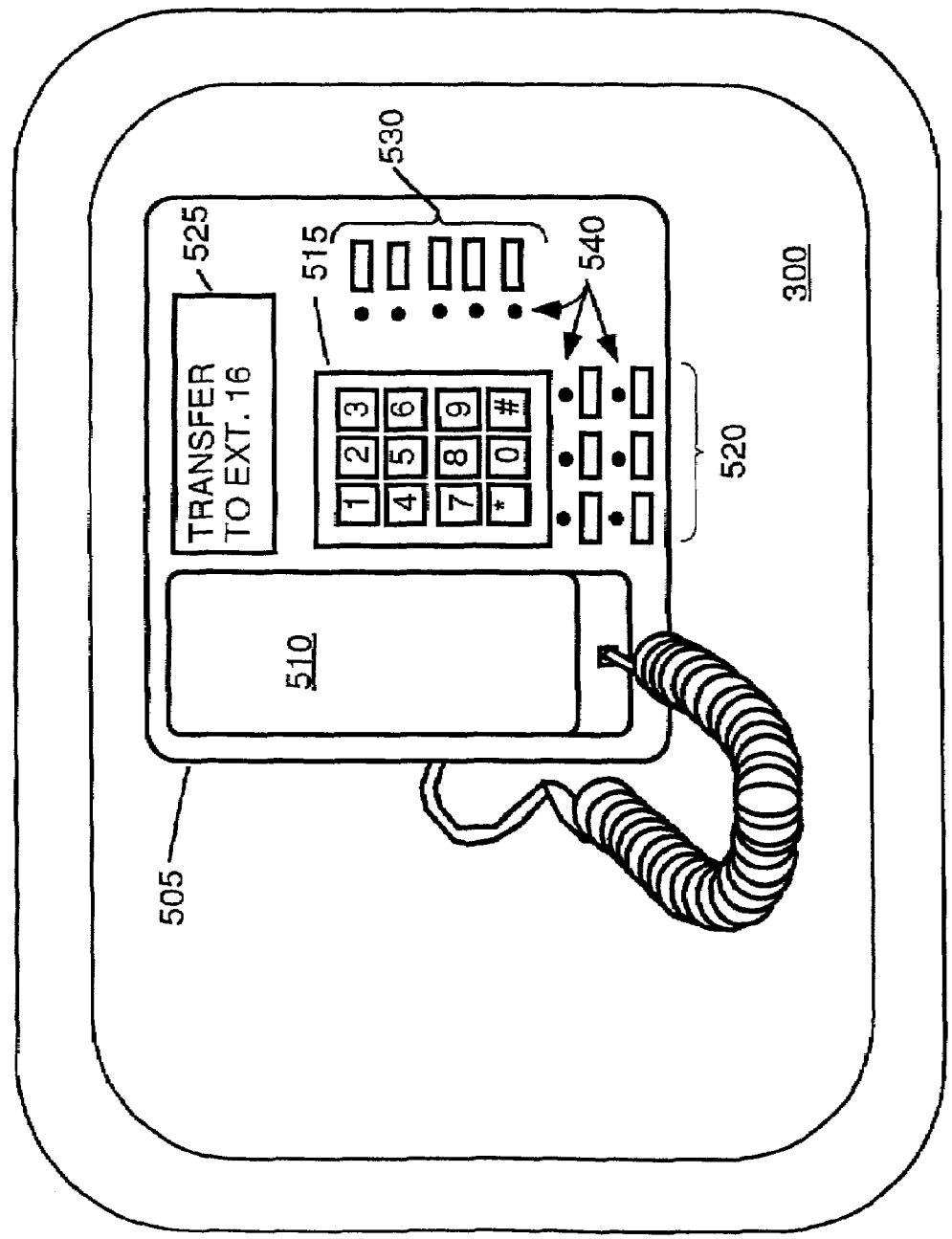
FIG. 5 is an illustration of the image of device, such as the user's telephone set, displayed on the screen of the communications device.

If the device 10 and the controller 225 are not connected at the time that the incoming call occurs then the controller 225 can call the current telephone number of the user, such as the hotel room of the user. The device 10 may be connected to the port 211A of the hotel telephone 211, or may be connected directly to the hotel PBX 212, or may be connected to a link 11, such as a cellular link, a satellite link, a global communication link, or some other link. When the room telephone in the hotel rings, or the call is relayed to the device 10, then the device 10 provides a ringing or other alert sound to the user, and presents a virtual telephone image, similar to image 505 (FIG. 5). The image 505 presents the information about the calling party which was sent by the controller 225. The image 505 also presents other information, such as flashing lights. The information could also be presented separate from the image 505, or could be available to the user by a command or a mouse click or a pulldown menu, etc. The user then instructs the device 10 what action to take, such as answer the call, refuse the call, forward the call to another number, etc. The device 10 then relays these instructions to the controller 225 and the incoming call is treated as specified by the user.

Further, as long as the controller 225 is connected with the user, even if the user is connected via the controller with an outside party, the user can use the portable communications device 10 to send instructions for creating and terminating a conference call, placing some parties in a conference call on hold while conversing with other parties, transferring calls, etc., in the same manner as if the user was at his main office using his telephone set 217A. Thus, all functions associated with the telephone set 217 are mimicked in, or replicated, by the device 10 so that call transfers, hold, etc., are done using device 10 in the same way as if the user was using the telephone set 217A.

In order to provide maximum convenience for the user, the portable communications device 10 displays folders, as in a Microsoft Windows™ environment. The folders represent the various office equipment that the user has at the office, such as the telephone set, an office computer, the facsimile machine, the printer, a server, etc., or may represent a person for establishing an e-mail connection or a telephone connection. If the user opens a folder, then the portable communications device 10 displays an image of the item selected. A folder is opened and the item selected by, for example, double clicking on the folder, clicking on the folder and then typing an "Open" command or choosing an "Open" command from a menu, etc.

The image displayed by portable communications device 10 includes images of the keys or buttons on the device. The user can then, such as by using a mouse, or control arrows and the numeric keypad, "press" the keys on the image and control the corresponding device as if the user was directly pressing the keys on the device itself.

Although the present invention is primarily described wherein the user has a telephone number for dialing an ISP, and using the Internet for voice/data communications via an ISP, it should be appreciated that the user can use any method of accessing the controller 225. For example, the user can access the controller 225 via direct dial-in, via satellite link, via an ATM link, or via any other communications link that will connect the user with the controller 225. For example, the user may dial the main corporate services telephone number through the office PBX 216, which then automatically routes such call to the controller 225.

If the user desires to make a credit card call, the portable communications device 10 is programmed to also add other prompts (not shown) for the user to enter the credit type, number, expiration date, different long distance access code, etc.

FIG. 5 is an illustration of the image 505 of the device, such as a virtual telephone set, which represents, as closely as possible, the user's telephone set. This virtual telephone image 505 is displayed on the screen of the portable communications device 10. The portable communications device 10 then displays the image 505 of the user's telephone set. The image 505 shows the handset 510 (shown "on-hook"), the dialing keypad 515, the user-programmable function keys 520, the non-programmable function keys 530 such as conference, transfer, redial, hold, mute, speakerphone, etc., the display lights 540, and the status display 525. These items, as presented in the virtual telephone image 505, are exactly the same as the user would see if the user were in the office and actually looking at the telephone set 217A.

The laptop 10 therefore presents, to the user, via a visual representation, a "virtual" telephone 505 which represents the same telephone 217 that the user has at the office. Just as the user can, in the office, use the office telephone 217 press buttons to place calls, receive calls, transfer calls, conference calls, place calls on hold, program the programmable keys 520 to do certain functions, cause the programmable keys 520 to execute those functions, cause the non-programmable keys 530 to execute their fixed functions, etc., the user can, from a remote location, use the virtual telephone 505 on the laptop 10 to perform these same functions. The actions that the user takes with respect to the virtual telephone 505 are the same actions that the user would take with respect to the office telephone 217, and the functions called by the actions, and the results of the actions, are the same, regardless of whether the user is using the virtual telephone 505 or the actual office telephone 217 to perform the action. However, whereas the office telephone 217 only works in the office 13, the virtual telephone 505 of the present invention works at any location from which a communications link may be established to the office.

Thus, to dial the number, the user would select the keypad 515 and then either use the numeric keys on the portable communications device 10 or click on the desired keys on the keypad 515. If the user has programmed speed-dial keys the user may simply click on the desired speed-dial key. For example, one or more of the keys 520 may be a speed-dial key. If the screen of the device 10 is a touch-sensitive screen, then the user may simply touch the virtual buttons 520, 530 on the image 505 on the screen to dial the number or perform the action just as if the user were pressing the actual buttons on the telephone in the office. The portable communications device 10 then sends this information to the controller 225. The controller 225 then converts the dialed number information to the format required by the PBX 216 and sends this information to the PBX 216 in that format. The required format may be conventional DTMF tones, CTI-based protocols (such as Lucent's ASAI™, Northern Telecom's Meridian Link™, etc.), or other binary data, such as when a speed-dial key is selected. As previously indicated, one or more of the functions of the controller 225 may be incorporated into the PBX 216 so that the portable communications device 10 communicates directly with or through the PBX 216 rather than communicating via the controller 225. The PBX 216 acts on the instructions, however provided, and sends back status information, preferably in the same manner. The portable communications device 10 converts the status information and causes the status information to be displayed to the user. The status information is preferably displayed exactly as the actual telephone would display the status information. For example, the status information may be displayed in the status display area 525 of the telephone set image 505. The status information may also be displayed via the appropriate light or lights 540, which will turn on, turn off, flash, blink, or pulse, etc. In the preferred embodiment, the PBX/ACD 216 is equipped with CTI software. Also, the controller 225 preferably has CTI services application software. Thus, the user sees a telephone which operates exactly as if the user was in the office and the telephone displays, in the same manner, the same information that the user would see if the user was in the office, both for originating and receiving phone calls. This means that the user does not have to learn how to operate a new telephone set each time the user leaves the office. Rather, via the device 10, the user can use the "same" telephone set that the user has in the office, regardless of where the user is located. This is a major convenience for the user, increases the efficiency of the user, and decreases the mistakes made by the user. The user is, in effect, using a telephone that the user is already familiar and comfortable with, so this generally improves the quality of life of the user and decreases the frustration level of the user.

Note that the communications between the remote device 10 and the controller 225 can be established directly at the controller 225 or through a PBX 216 and/or other corporate device 220 which is connected to the controller 225.

In a similar manner, from the screen shown in FIG. 3, the user may choose other equipment by selecting and opening the folder for that equipment. For example, the user may retrieve the user's facsimile messages by selecting the facsimile server represented by the folder 309A. An image (not shown) of the facsimile server will then appear on the screen of the portable communications device. The user then clicks on the proper buttons on the image of the facsimile server, or selects the proper instructions from a pulldown menu, to instruct the facsimile server to show a list of the facsimile messages that have been received and are addressed to the user, select and download one or more of these messages to the portable communications device 10, upload new messages from the portable communications device 10 to the facsimile server for immediate or later transmission. In a similar manner, the user may retrieve his e-mail by selecting the folder 313. Therefore, whatever corporate facilities that the user can access while in the office, and whatever operations that the user can perform using these facilities, while the user is in the office using his telephone or his desktop computer 221, the user can access, and the user can perform, and in the same way, using the remote device 10 while away from the office.

The present invention thus provides a seamless, virtual, voice and data environment. Whatever the user can do from his desk in his office using the office telephone or a computer in the office, the user can do with the laptop device 10 as the user goes to a hotel, or is on a beach, or is in an airplane. Voice conversations, web browsing, Internet access, e-mail, database access and updating, etc., can be performed by the user from anywhere using the laptop device 10 just as though the user was in the office. In effect, when the user goes, wherever the user goes, the telephone on the user's desk and the laptop/computer on the user's desk go with the user, and they perform the same functions, they look the same, and they respond the same, just as if the user was still in the office. The displays, the buttons, the flashing lights, etc., are the same. Thus, the user sees a virtual corporate facility which operates exactly as if the user was in the office and the virtual corporate facility displays, in the same manner, the same information that the user would see if the user was in the office. This means that the user does not have to learn how to operate a new server, fax machine, telephone, database, application, etc., each time the user leaves the office. Rather, via the device 10, the user can use the "same" corporate facility that the user uses in the office, regardless of where the user is located. This is a major convenience for the user, increases the efficiency of the user, and decreases the mistakes made by the user. The user is, in effect, using a corporate facility that the user is already familiar and comfortable with, so this generally improves the quality of life of the user and decreases the frustration level of the user.

Assume now that the user has used the office facilities to call another person, has completed the conversation, and that the called party 12, but not the user, has now hung up. In the preferred embodiment the PBX 216 has been programmed to hang up the line to the called party when the called party 12 hangs up. However, the user may wish to maintain the connection with the controller 225 even after the called party 12 has hung up so that the user can, via the controller 225, call another party, check the voicemail, check for or send an e-mail message or a facsimile message, etc. Therefore, the PBX 216 or controller 225 does not necessarily or automatically terminate the connection to the user. Rather, the PBX 216 or controller 225 only terminates the connection to the user if the user issues a "terminate session" command, unplugs the remote device 10 from the network, or the central office 215 advises the PBX 216 that the user or the controller 225 has hung up.

Certain commands, such as those pertaining to establishing and terminating telephone calls to telephone sets 217 or to an outside party 12, may be received by the controller 225 and then sent to the PBX 216, or may be directly acted upon by the PBX 216.

Different situations may exist, depending upon the user's portable equipment and the equipment at the user's remote location. (1) The portable communications device 10 has audio and video equipment (speaker, microphone, headset, audio and video codecs, etc.) (not shown), and a voice-over-data modem (not shown). In this case, the portable communications device 10 is always in communication with the controller 225 via the communications link and a modem pool, such as may be in the controller 225, the PBX 216, or in the corporate devices 220. (2) The portable communications device 10 has audio and video equipment (not shown), and a conventional modem (not shown). In this case the portable communications device 10 is in communication with the controller 225 using the Internet for voice/video and data. (3) The portable communications device 10 does not have audio equipment so the user must use the telephone set 211.

In the first and second situations, the portable communications device 10 and the controller 225 are in communication via the modems even when the user is using the audio equipment to talk to the called party 12.

In some situations, such as the third situation, the portable communications device 10 and the controller 225 are not in communication when the user is using the telephone 211 to talk to the called party 12. Therefore, the modems are programmed to remain off hook even when the remote carrier disappears. The modems then attempt to reestablish communications, either continuously or periodically, until dial tone is detected or a controlling device (such as portable communications device 10 or controller 225) instructs the modem to hang up. When the user is using the telephone 211 the modems will lose communication, but when the user is finished using the telephone 211 the modems will be reconnected to each other and will then reestablish communication with each other, thereby reconnecting the portable communications device 10 and the controller 225 for supporting further or additional data communications and/or commands. Therefore, when the user has finished using the telephone 211, the portable communications device 10 and the controller 225 will automatically reconnect and will be standing by, ready to receive and operate upon the user's next command so that the user can place another call, check the e-mail, check the facsimile messages, access office information and resources, etc.

The user can establish voice-only communications with a desired party, who may be another person at the office or may be a person outside of the office, such as a family member or a friend. The user uses the portable communications device/communications device 10 to establish communications with the controller 225, preferably using the Internet. Controller 225 then commands the PBX 216 to establish, or the PBX 216 on its own establishes, voice communications with the desired party 12. If the user uses the Internet to contact the controller 225 or the PBX 216, the remote user can communicate with the desired party at the cost of a local call, even when the user is outside of the local calling area. This can be accomplished without accessing the office servers, applications, hosts, etc., if desired.

The conversion instructions required to operate the various equipment and the associated services displayed in FIG. 3 may be stored in the memory (hard disk, floppy disk, CDROM disk, ROM, EEPROM) of portable communications device 10. Storage in the memory of the portable communications device 10 provides for fast operation because the conversion instructions do not have to be transferred.

The conversion instructions required to operate the various equipment and the associated services displayed in FIG. 3 may also be stored in the memory of the controller 225 and provided by the controller 225 to the portable communications device 10 once a connection is established between the controller 225 and the portable communications device 10. This conserves memory in the portable communications device 10 but requires more time because the conversion instructions must be transferred.

Also, the conversion instructions may be stored in the controller 225 but only some, or none, of the conversion instructions are transferred to the portable communications device 10. This provides for fast operation and still conserves memory in the portable communications device 10 because few if any instructions must be stored in the portable communications device 10 or transferred to the portable communications device 10. The conversion instructions stored in the device 10 in this case are preferably the most frequently used conversion instructions, such as those relating to the PBX 216 or the voicemail system 218, the office applications and devices 220.

Therefore, once the user has called into the system (PBX 216 and controller 225), the user may operate as if the user were at his/her office and use all of the equipment and facilities that would be available to the user if the user were actually at his/her office. If the company has several sites, connected by one or more communications links, then the user could call into one company office site and be connected, via the established/existing communications links, to the other company office sites. For example, assume that the user is in Tokyo, Japan, and the company has office sites in Tokyo, Japan, in London, England, and in Atlanta, Ga., U.S. The user can establish communications with the local office in Tokyo, a local access call, and be connected via the company's established/existing communications links to the office sites in the U.S. and in England. Similarly, if the user has access to an ISP in Tokyo, the user would call the Tokyo ISP and use the Internet for the communications link. Thus, using only local access and rates, the user in Tokyo can talk to called parties in London and Atlanta, access and operate on enterprise-wide data and information, by using the company office site equipment in Tokyo and/or in London, or using the Internet, but the user is able to accomplish this without knowing the details of operation of any different equipment, such as the details of operation of the equipment at a different company office site, for example, Tokyo or London.

As another example, if the office site that the user is connected with has specialized telephone services or features, such as ANI, caller ID, and call waiting features, then these features would also be available for use by the user at the remote location. For example, if the user is on a call to a called party 12 and another party (not shown), calls the user, then the user would hear the call waiting tone, and the caller ID/ANI information would be sent by the controller 225 and would appear on the portable communications device 10 on, for example, the display 525. Thus, the user could decide, even from the remote location, whether to accept the waiting call, transfer it to voicemail or to another person, or disconnect it.

In one implementation of the present invention a controller 225 will be installed at each company office site location. For security reasons, full utilization of the services of a controller 225 at a particular office may be used only by the authorized users/employees of that site. If a user from another company site calls into the controller 225 then the controller 225 will, in that case, connect the user with the controller 225 at the user's home office. For example, if an Atlanta user/employee is in Tokyo, and the Tokyo office is equipped with a controller 225, the Atlanta user can call into the Tokyo office, and the Tokyo controller 225 will connect the Atlanta user with the Atlanta controller 225. Also, the Atlanta user 225 may directly connect to the Atlanta controller 225, such as by using an Internet connection or a dial-up connection. In either case, once the Atlanta user is connected with the Atlanta controller 225, the Atlanta controller 225 will send, to the controllers at the other sites, the commands necessary to implement the tasks instructed by the Atlanta user. For example, the Atlanta user in Tokyo may call the Tokyo controller 225, which will connect the Atlanta user to the Atlanta controller 225. Using the device 10 in the manner described herein, the user will then instruct the Atlanta controller 225 to set up a conference call to a first person in Tokyo and to a second person in London. The Atlanta controller 225 will then instruct the Tokyo controller 225 to set up a call to the first person, and instruct the London controller 225 to set up a call to the second person. The Atlanta controller 225 will then cause the parties to be conferenced together. The conferencing function may be performed by the Atlanta controller and PBX, or the Atlanta controller may instruct the London controller to forward the connection to the second party to the Tokyo controller 225, and also instruct the Tokyo controller 225 to cause the Tokyo PBX to conference together the Atlanta user, the first party in Tokyo, and the second party in London. Thus, by using established inter-office links, or the Internet, between the various office sites, all calls are local access calls. Therefore, depending upon the facilities available, and the costs involved, the Atlanta controller 225 will select the connections necessary to perform the desired function at the most economical rate.

Certain users, such as high-ranking corporate officers, may have access to full utilization of the services of a controller 225 at an office site even if that user is not an employee of that site. In this case it will be appreciated that different office sites will have different equipment and facilities, and that these different devices may require different commands to accomplish the same task. For example, the exact commands to the PBX 216 in Tokyo to set up a call to a party 12 may be different than the exact commands to PBX 216 in London to set up the call, or the exact commands to the PBX 216 in Atlanta to set up the call. Therefore, where the business has multiple office sites and multiple controllers, PBXs, corporate devices, etc., then, upon connection with the controller 225 at the called office site, the device 10 will send to that controller 225 a list of the device types that the user has at the user's office. For example, if an Atlanta user calls the Tokyo controller 225 then, in response to receiving the list of device types, the controller 225 will consult a profile table to establish the relationship between the commands sent by the portable communications device 10 and the commands necessary to properly operate the local Tokyo PBX 216. Thus, the Atlanta user is not required to be connected with the Atlanta office location in order to use equipment functionally similar or identical to that available at the Tokyo office location.

Further, when the user calls into one location, for example, Tokyo, and requests connection with another office site, for example, London, the portable communications device 10, or the controller 225 in Tokyo, will send the list of device types to the controller 225 in the London office, which will then consult a profile table to establish the relationship between the commands sent by the portable communications device 10 and the commands necessary to properly operate the local PBX 216 in London. The display 300 on the portable communications device 10 may include folders (not shown) or pull-down menu selections (not shown) for the different connected offices so that the user can quickly and conveniently select which office is used to perform a particular function. For example, the user can initially call the office in Tokyo, access the link to the office in London, establish a call to a party in London, access the link to the office in Atlanta, establish a call to a party in Atlanta, select the office in Tokyo, and then send a command to the PBX 216 in Tokyo to establish a conference call by linking together all three parties (user, party in London, party in Atlanta). Thus, the user has been able to establish a conference call among parties in three different countries without knowing the capabilities of the hotel in Tokyo where the user is staying or the telephone or voice commands necessary to use those capabilities.

Additionally, calls destined for the user can be routed by the controller 225 to wherever the user specifies, including the user's current location. The user can store a user profile in the controller 225 which the controller 225 inspects whenever an incoming call for the user is received. The controller 225 may route the call to the user's voicemail, the user's assistant, the user's home, a co-worker, or even to the user's hotel room in Tokyo. The direction of the routing may be based upon the time of day, either where the controller 225 is located or where the user is located, may be based upon the telephone number of the calling party 12, such as is provided by ANI, may be based upon a priority code that the user gave to the calling party 12, etc. When the calling party 12 calls the user's telephone number, the controller 225 checks the routing factors to determine how the incoming call should be routed and acts accordingly. For example, assume that the calling party 12 is a business contact with whom the user wants to discuss business. Based upon the telephone number of the calling party 12, or priority code, the controller 225 will cause the call to be connected to the user's hotel room in Tokyo, where the user's telephone will ring. The calling party 12 will be connected to the user but will not even know that the user is in a hotel room in Tokyo. It is contemplated that the user will have several "call-treatment profiles". These can be preprogrammed by the user, or programmed by the user from the remote location at any time. The user selects the desired profile for his convenience and privacy and changes the selected profile as desired. The user may also have a profile which automatically selects different profiles, depending upon the time of day or where the user is currently located.

When an incoming call for the user occurs, the connection of the incoming call to the user may be by any available communications link. For example, the controller 225 may instruct the PBX 216 to dial the user's hotel room in Tokyo. This is a long distance call. As another example, the controller 225 may dial up an Internet ISP and establish a voice/data link over the Internet to an ISP in Tokyo, which then connects with the local telephone company, which calls the user's hotel room in Tokyo. In this manner, the call has been routed to the user in Tokyo but the routed call is billed as a local call, rather than a long distance call.

It should be appreciated that the present invention allows the remote user to establish and use voice communications while simultaneously accessing other corporate resources, databases, services, hosts, facilities, etc.

The present invention also provides for use with "proxy agents" to provide transparency of operation for the remote user. The proxy agent at the user's home office provides communicates with all of the local equipment and services and translates remote messages to those used by local devices and services. The proxy agent at the remote device 10 provides local service/device emulation or presentation via communications with the home proxy agent. This allows different proxy agents to be used for a variety of services or devices at multiple locations. It also allows for different types of agent proxy functions. One type is where the user is using a device 10 to access the services and features of the home office location 13. Another type is where the user has no device 10 with him so the user, using a conventional telephone 211, establishes a voice call into the user's home office 13 and, through a series of DTMF tones or voice commands, the user instructs the PBX 216 to put parties on hold, establish a new call, verbally read the user's e-mail to the user, etc. The agent proxies of this type may also be installed into the device 10 so that, if the user has the device 10, the user may use voice and/or DTMF commands and receive his e-mail verbally. Thus, a variety of agent proxies may be installed into the device 10 to interface with the agent proxies at the several office locations.

Figure 6A:
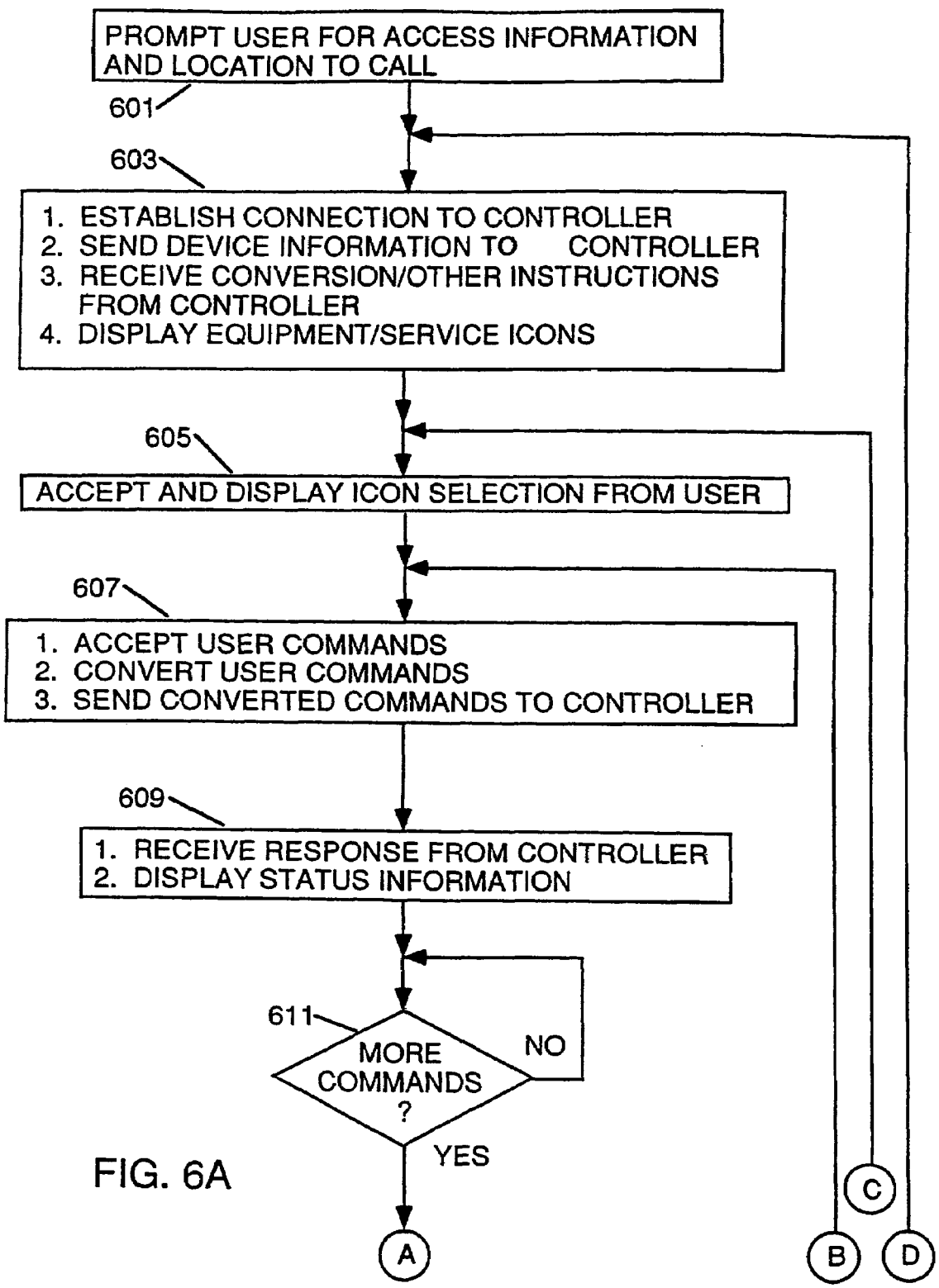
FIGS. 6A and 6B are a typical flowchart of a typical procedure used by the communications device.
Figure 6B:
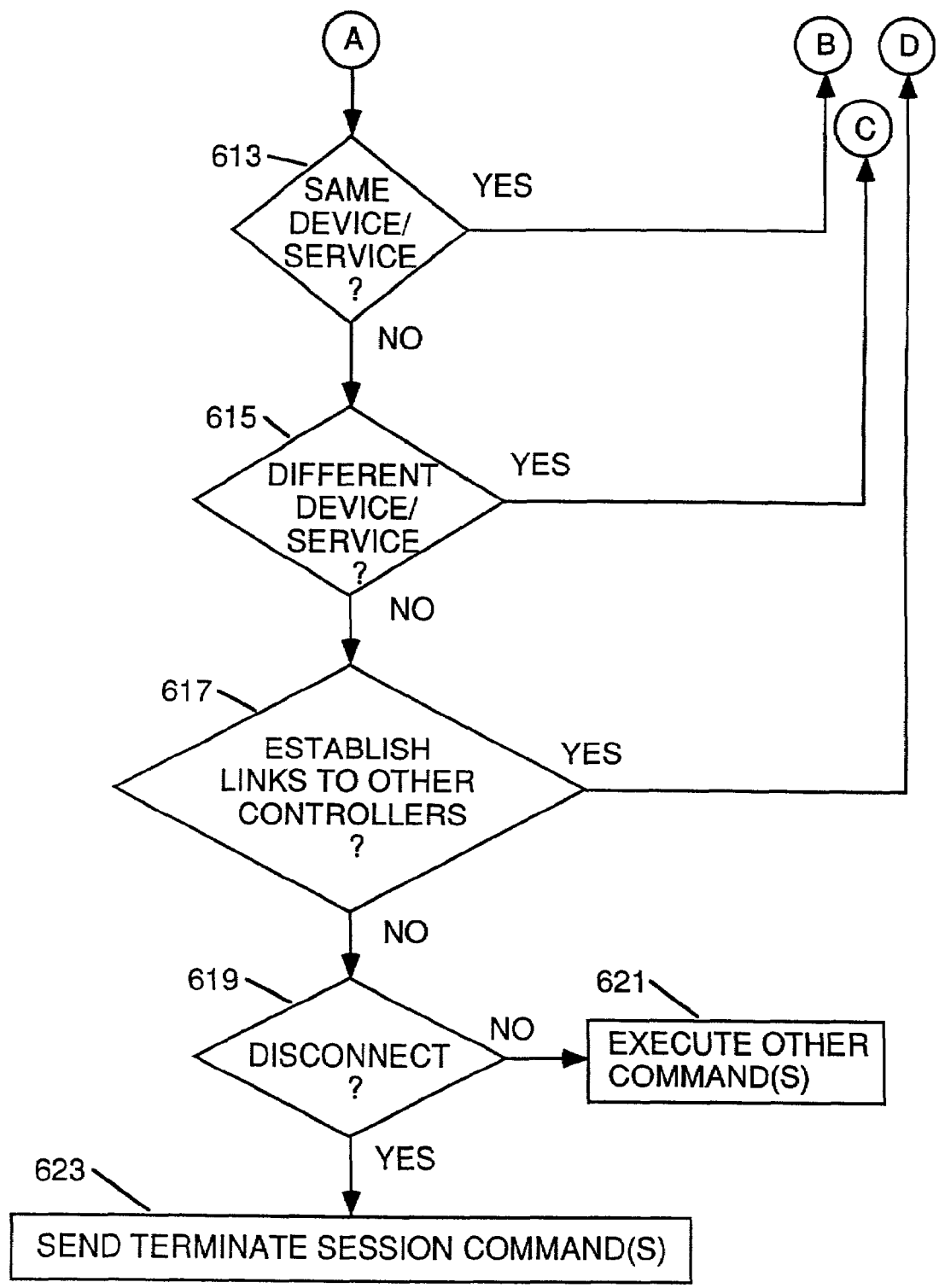

FIGS. 6A and 6B are a flowchart of the procedure used by the portable communications device 10. In step 601, the portable communications device prompts the user to enter the access information for the call and for the office or other location which is to be called. In step 603 the portable communications device establishes the connection with the specified controller, sends the device information to the controller, receives the conversion or other instructions from the controller, and displays the equipment and service folders for the user.

In step 605 the portable communications device accepts and displays the folder selection from the user. In step 607 the portable communications device accepts the user commands, converts the user commands, and sends the converted commands to the controller.

In step 609 the portable communications device receives the response from the controller and displays the status information to the user.

In step 611 the portable communications device waits for more commands from the user. If there are more commands, for the same device or service, then in step 613 the portable communications device returns to step 607. If there are more commands, but they indicate that a different device or service is desired, then the portable communications device returns to step 605 to accept the folder selection from the user. If there are more commands, then step 617 tests whether they indicate that the user wishes to establish a link to another controller and whether the user is authorized such direct links. If so, then the portable communications device returns to step 603. If not, step 619 determines whether the command is a disconnect command. If the command is to disconnect then in step 623 the portable communications device sends the "terminate session" command to the controllers with which it is linked. If the command is not a disconnect command then the portable communications device determines the command to be executed and performs that command in step 621. For example, the command may be to call up another program or a document on the portable communications device 10.

It will be appreciated that certain steps are not necessary in all cases. For example, part of step 603 and step 617 are not necessary where the company only has one office site and therefore only one PBX 216, or the user is only allowed access to his home base site.

Figure 7A:
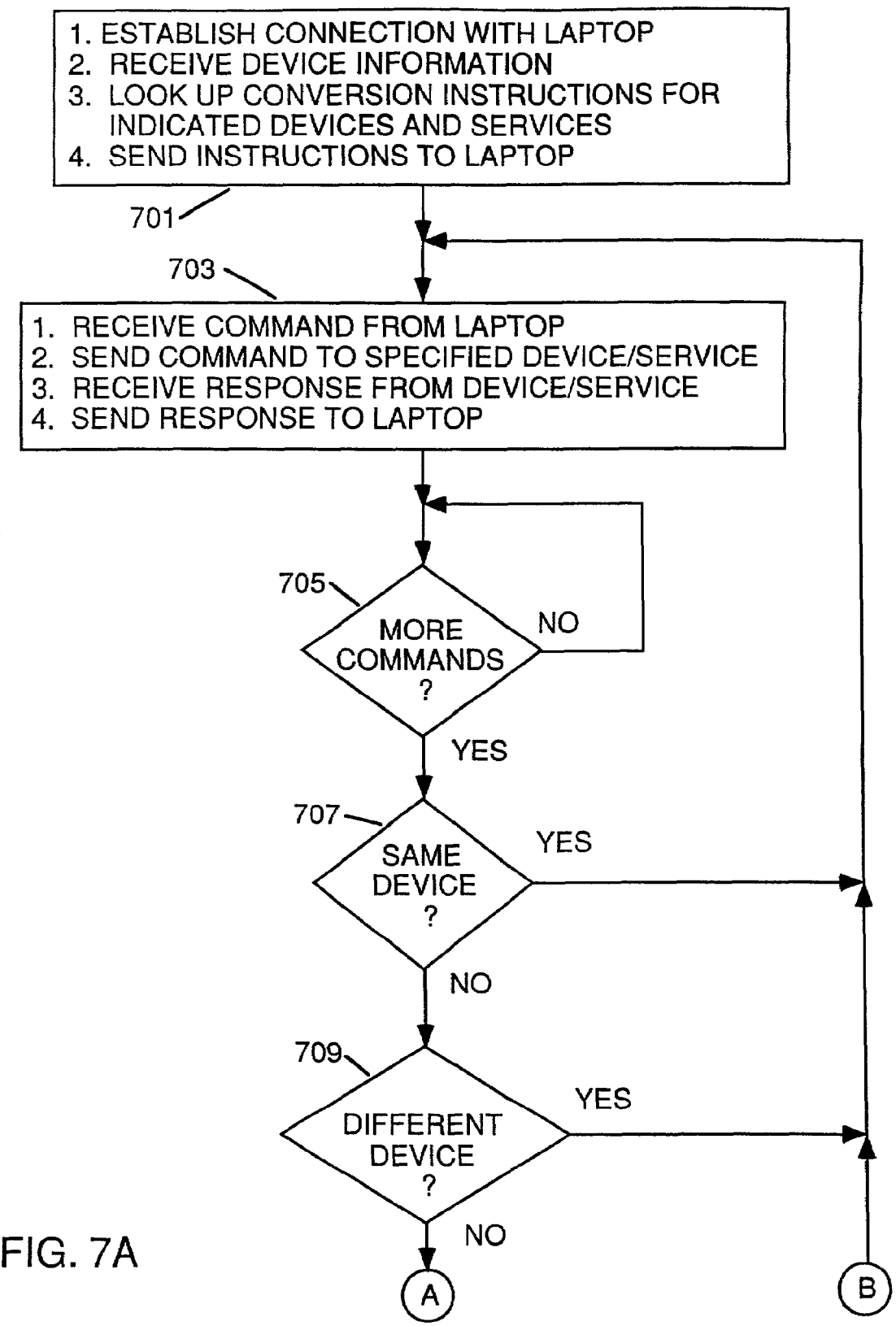
FIGS. 7A and 7B are a flowchart of a typical procedure used by a controller.
Figure 7B:
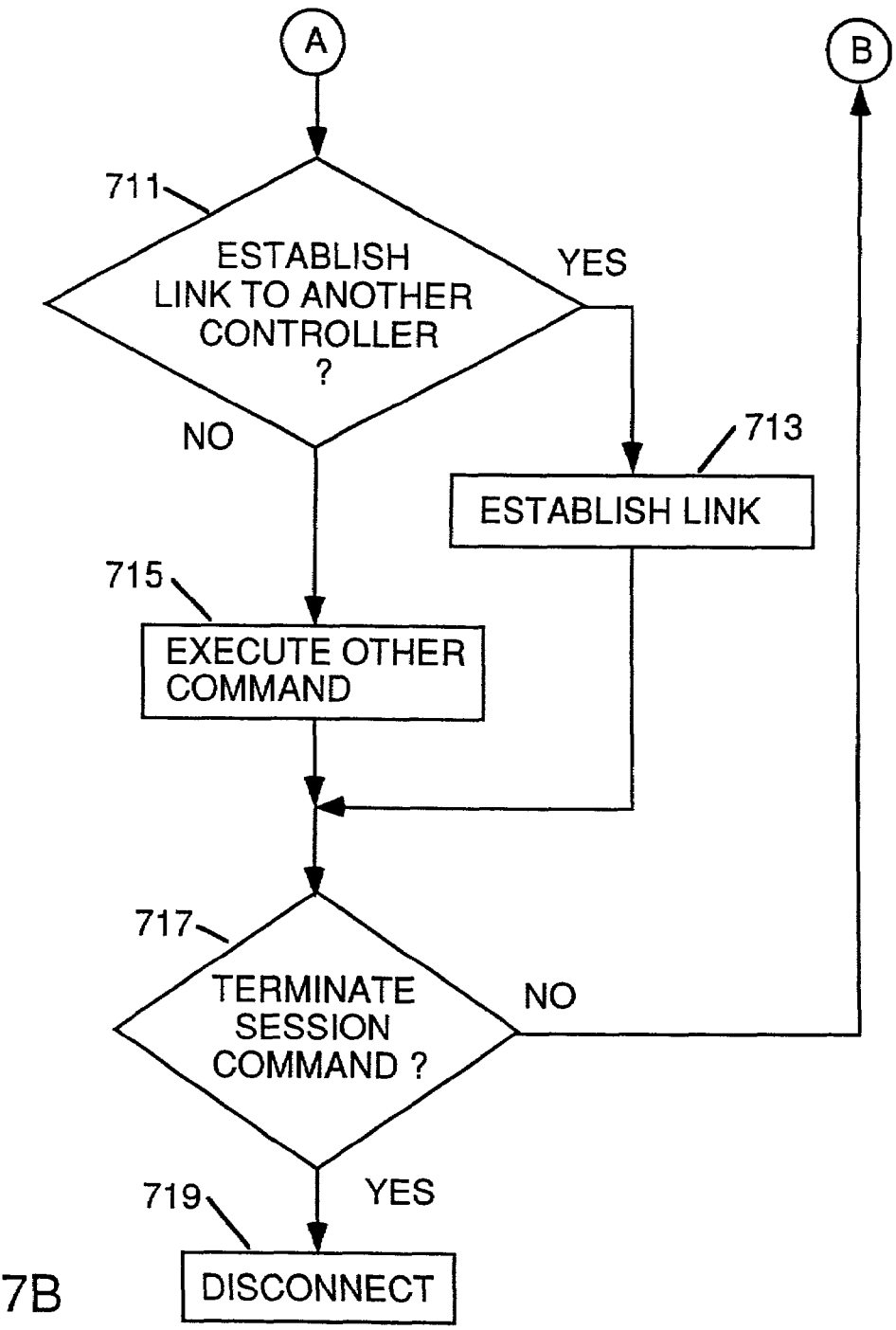

FIGS. 7A and 7B are a flowchart of the procedure used by a controller 225 in step 701 communication is established with the portable communications device, the controller receives the device information from the portable communications device, and looks up the profile instructions appropriate for the devices/services specified by the portable communications device and the devices/services available to the controller, and sends the conversion and other instructions to the portable communications device.

In step 703 the controller receives instructions from the portable communications device, sends the appropriate command to the specified devices/services, receives any response from the devices/services, and sends the response to the portable communications device.

In step 705 the controller waits for more commands. When a command is received the controller determines in step 707 if the command is for the same device/service. If so, then step 703 is executed. If not then, in step 709, the controller determines if the command is for a different device/service. If so then the controller executes step 703 for the newly specified device/service.

If not then, in step 711, the controller determines if the command is to establish a link to another controller (another office location). If not then, the controller proceeds to step 715. If so then in step 713 the controller establishes the specified link. The controller then proceeds to step 717.

In step 715 the controller executes any command not described above. For example, the command may be to disconnect from a remote controller at another site.

In step 717 the controller determines if the command is to terminate the session. If so then in step 719 the controller instructs any connected remote controllers to disconnect and then the controller disconnects. The controller is then ready for the next call. In the preferred embodiment a controller has the speed and memory to simultaneously service multiple remote access calls.

In one embodiment, the portable communications device 10 is capable of combining voice and data into a single information stream, and transferring such dual information stream via a voice over data modem or a conventional high speed modem.

As technology advances, and as costs decline, portable communication devices 10 will become more and more compact, and functionality will increase. If size, weight and cost were not factors, one embodiment of the portable communications device 10 would include a cellular and/or a satellite communications transceiver, including applications support for various wireless communications protocols. The use of cellular and/or satellite for the communications link, instead of the conventional wire-based telephone system, provides for complete mobility, regardless of the location of the user. However, in another, lower cost embodiment, the portable communications device 10 of FIG. 1 is simply a laptop computer without audio capability, with only GUI displays for selected equipment and telephones, and with reduced user profile information.

The portable communications device 10 may be used both for work in the office, instead of computers 221, and for remote work (Work-On-The-Go™).

A laptop computer with multi-media capability is often used by traveling business personnel for the office as well as for remote access to corporate data resources. In the office, the laptop computer is generally used with a larger video display monitor, a "docking station" which is connected to the corporate network, and sometimes with a larger keyboard.

A typical laptop has two PCMCIA (Personal Computer Memory Card International Association) card slots, where one slot is used to house a fax/modem device and the other slot is used to house a network interface card (NIC), i.e., TCP/IP device, which connects the laptop to the network facilities of the main office 13. Additionally, a video connector is provided to allow for connection to an external monitor and provide a larger viewing screen. So a typical laptop is used at the office, via the NIC interface, to access all resources of the enterprise which are available on the office network. The modem/fax connection provides the same access when the user is away from the office.

With the present invention, the user, when in the office, can use the GUI/screen-based telephone function provided by the device 10 for placing calls, transferring calls, receiving calls, etc., while using the telephone set 217 present at the user's desk in the office for the audio communication. At the same time the user can simultaneously browse or access various applications within the enterprise using the devices 221 or 10. This combined functionality 10 of computer based control via the device 10/221 and the telephone set 217 allows the user to use his/her telephone device (217) and is preferably accomplished by two CTI application software components. One component is a desktop client application running in the device 10/221, similar to TAPI, which communicates with a CTI server, such as the controller 225, which in turn communicates and relays the user's controls/commands to the PBX 216.

The commands may be provided by using a mouse, and clicking on a "Call Transfer" GUI button, or clicking on a "Conference" GUI button or the user may simply dial a desired telephone number by using the screen based telephone set (FIG. 5). The other component is a server-based CTI application or interface, such as TAPI by Microsoft, or TSAPI by Novell, CTCONNECT by Dialogic, or CallPath by IBM. This application allows the device 10/221 to communicate with and control a PBX/ACD device (or devices) 216.

Because the user, while in the office, can control and have access to both 25 information and telephony functions from his computer (221) instead of using his telephone set (217) while in the office, corporate services may be securely extended to remote site, where the client applications software, running in device (10) is the same software running in the office computer (221), thus assuring that the person traveling could use a different computer while in the office than when on the road.

Some laptops/computers 10/221 have built in sound/voice facilities, microphone, speakers and video services (i.e., are multimedia enabled).

Therefore, the user away from the office 13 does not need to use a telephone set, but instead can use the built in voice/video capabilities of the laptop 10 to communicate with his office 13. In one environment, the user communicates via the Internet, which in turn exchanges the voice, video and data information between the controller 225 and the portable communications device 10.

If the laptop 10 has video capability, the user can, by using the video capability and Internet access, establish a videoconferencing call with the main office 13 or with an outside party 12, such as a client. If Internet access is used, this can be accomplished at the cost of a local telephone call.

In another embodiment, the features of a telephone set 217 are programmable. Some features are programmable by the user by using the keys 515, including variable function keys 520, on the telephone set 217. Typically, the details of the programmable features of a telephone set 217 are stored in the PBX 216. Preferably, the features can also be programmed via any computer which is connected to the network 224, including but not limited to computers 221. For convenience of explanation, reference will be made to the computer 221A and the telephone set 217A. User commands are sent by the computer 221A to the PBX 216. The PBX 216, in turn, sends programming commands to the particular telephone set 217A via lines 223. The commands from the computer 221A to the PBX 216 may be sent by any desired or convenient protocol, such as CTI commands. Of course, it is preferred, but not necessary, that the protocol be one used by the PBX 216 so as to avoid the need for upgrading or retrofitting the PBX 216. In response to commands from the computer 221A, the PBX 216 stores the programmable feature details and then sends programming commands to the telephone set 217A via DTMF, a digital data stream, an ISDN, D-channel, or other standard or proprietary techniques. In one embodiment, the telephone sets 217 are ISDN, BRI (basic rate interface) digital telephones and voice communications are conducted via one or more ISDN "B" channels, while data/commands are handled via the ISDN "D" data channel. Also, although in many conventional telephone systems the programming information is stored in the PBX 216 and the telephone set 217A is a "dumb" telephone set, the present invention also contemplates that the telephone set 217A has a memory (not shown) in which programming information is independently stored. Examples of information that is typically programmed are speed dial numbers and call billing information so that the user only has to press one or few keys on the telephone set 217A in order to place a call to an outside party.

Further, in one embodiment, the programming information is not stored in the PBX 216. Rather, the computer 221A sends the programming commands to the controller 225, where the controller 225 also stores the programming information for that telephone set 217A. If desired, some of the programming information can also be stored in the PBX 216. In another embodiment, the computer 221A only sends the programming information to the PBX 216, and the PBX 216 sends the programming information, or updates thereto, to the controller 225. Other methods may also be used.

In addition, in one embodiment, the controller 225 contains programming information for features that are not available from the PBX 216 or are not available using only the telephone 217A for programming. The PBX 216 queries the controller 225 as to the handling of each call to or from the telephone set 217A. Alternatively, the PBX 216 sends, to the controller 225, each call state and status to or from the telephone set 217A, and the controller 225 then instructs the PBX 216 how to route the call.

Thus, the user may, using the computer 221A, instruct the controller 225 how his calls are to be handled. For example, the user may specify that calls from certain numbers are to be forwarded to an assistant, calls from other numbers are to be routed to voicemail, calls from other numbers are to be forwarded to the user only if the user is at a certain location and/or only at a certain time and/or date, calls from other numbers are to be forwarded to the user regardless of where the user is currently located and/or the time and/or date, etc. Thus, the user can specify exactly how each incoming call is to be treated. In addition, the user can also specify the handling of outgoing calls, such as what carrier or communication link to use, what person(s) should be conferenced on the call, etc. The user can also set up calls in advance, so that at a specified time and date a certain party is called and a message delivered, or at a specified time and date the user is called, wherever he may be located, a certain party is called and then the user and the called party are conferenced together. The user can therefore establish a "profile" for himself which specifies, in as much detail as the user desires, how incoming calls and outgoing calls are to be treated, regardless of whether the user is in the main office 13 or is located elsewhere.

As stated, the controller 225 contains the programming information, such as the "user profile". Therefore, when a user is going to be away from the main office 13, the user downloads his profile from the controller 225 to his portable communications device 10, which allows the device 10 to emulate the actions of the user's telephone set 217A. The device 10 thus acquires all of the profile information for the user, including personal preferences, pre-programmed functions/buttons, private directories, etc., and the device 10 can treat incoming calls and place outbound calls in the same manner as if the user was in the office 13 and using the PBX 216. Thus, the user can use the device 10 in the same manner as the user would use his office telephone 217A. The profile information may be downloaded from the controller 225 via the lines 214, 218, 224, or via any communication link 11 which is connecting the device 10 and the controller 225. Likewise, the user can modify the profile in the device 10 and upload the modifications to the controller 225, or the user can directly modify the profile in the controller 225. Uploading and modification of the profile may be accomplished via the LAN lines 214, 218, 224, or via any communication link 11 which is connecting the device 10 and the controller 225.

When a user wishes to use his telephone the user can select the "My Telephone" folder 305, as shown in FIG. 3. In response, the device 10 will present a graphical user interface (GUI) display of the user's telephone set 217A, as shown in FIG. 5. The telephone set 505 shown in FIG. 5 is an example of a typical electronic telephone. In one embodiment, the device 10 has a GUI display for a variety of different telephone types and manufacturers. In the same manner and with the same ease as selecting a printer on a network, the user can, at any point, specify the particular make and model of telephone set at the main office 13 and the device 10 will present a GUI display which is representative of the actual telephone set 217A. The device 10 may have a plurality of GUI displays, or may only have a GUI display for the telephone set 217A which is used by the user when the user is in the office 13. If additional GUI displays are needed in order to present the user's telephone, then such displays may be stored in controller 225 and downloaded by the remote device 10 when desired or needed.

The user can modify or use the profile in either of two ways: (1) by "operating" the keys on the GUI display in the same manner as if the user were actually pressing keys on his office telephone 217A; and (2) by a series of pull down menus, dialog boxes, and key commands. Thus, simple actions, such as dialing a speed dial number, may be accomplished by "operating" the appropriate key on the GUI display. Complicated actions, such a programming incoming call treatment, is preferably accomplished by menus, dialog boxes, and a mouse.

Now, as the user's telephone set profile is present in the device 10, the user only needs to establish a communications link 11 to/from the remote device. The user can then, as shown in FIG. 4, select and log on to the desired communications link 11. Of course, passwords and security procedures are preferably employed by the device 10, by the communications link 11, and by the controller 225. For example, the desired (or available) communications link 11 may be the Internet, satellite service, cellular service, a corporation communications server for "intranet" access, a standard long distance carrier, etc. Depending upon the location and the communications links available, the user may need to provide or select the country, area code, remote PBX's local or long-distance access codes for situations where dial-up telephone service is used, etc., also as shown in FIG. 4. In one embodiment, the user will initiate a single dial-up link to an ISP, and establish communications with the controller 225, which in turn provides for both voice and data to be communicated over the Internet using voice over IP or another communications protocol.

Today, many of the manufacturers of PBX/ACD systems provide telephone sets 217 that provide special features but which function only with that manufacturer's PBX/ACD, and which often use a unique and/or proprietary protocol for communications. Further, the features and the telephone sets are constantly changing and evolving. Both proprietary and non-proprietary digital or ISDN telephones can activate an application program residing within the corresponding PBX/ACD. For example, pressing a function button on a telephone set 217 may cause the PBX/ACD 216 to "block" all calls to the telephone extension at which that telephone is located.

Also, entering a sequence of digits, e.g., "#201", may cause the PBX/ACD 216 to execute sequence of steps, sometimes called a "call flow" sequence, such as dialing a specific telephone number and, if such is busy, calling another number, or if there is no answer or if an answering machine is detected, placing the call again, either immediately or after a certain amount of time. Such "call flow" sequences are programmed into a PBX/ACD 216 and operate in a manner very similar to "Stored Procedures" currently supported by many Relational Database vendors.

The same sequence of events can take place even while the user is away from the main office 13. The user simply "operates" the function buttons or keys on the GUI representation of the user's telephone set (FIG. 5), and the device 10 initiates the desired action, or causes the controller 225 or the PBX 216 to initiate the desired action by executing the internally stored "call flow" application program.

It is envisioned however, that future PBX/ACD platforms will not be limited to call flow procedures which are stored and executed internally to the PBX/ACD. Future PBX/ACD platforms will contain fewer such procedures but will be more controllable via external application servers. This is technologically possible now, but cost and proprietary considerations are such that present PBX/ACD platforms do not function in this manner. Thus, in one embodiment, applications responsible for call flow/call routing are user programmable and controllable, so more or additional capabilities are available through the PBX/ACD and external applications servers and, while available locally, is also available remotely to users who are away from the main office 13.

The controller 225 also performs translations between different protocols. Communications, whether voice, video, data, or two or all of these, may be received at the controller 225 via the PBX 216 and the LAN 223, from an ISP via a direct line 218C, or from another computer 221 via the LAN 223, or from a telephone 217 via the PBX 216, or from a web server, or from a videoconferencing system or server, etc. Each originating device, and each communications link, may use a different protocol, for example, H.320, H.323 and H.324 video and voice-over-internet protocols. The controller 225 translates the various incoming communications into a predetermined protocol set, which may be a protocol used only by a specific device, or may be a protocol which is used by more of the devices, for example, the PBX 216, a voicemail server, a video server, etc. The controller 225 then performs any necessary action on the incoming communication, such as separating incoming voice and incoming data, removing and/or adding voice and data, and combining outgoing voice and outgoing data. The controller 225 then converts the combined outgoing voice and outgoing data into an outgoing communication in the protocol necessary for the destination device. Similarly, the separating and translating of data, video and voice, as well as the combining of voice, video and data for the destination devices, are done by the controller 225. Thus, the controller 225 performs translation, modification, and routing of communications having diverse information types and protocols among different devices and systems. As such, the controller 225 also functions as a gateway for the various communications.

Alternatively, instead of a single device such as the controller 225 performing all of these functions, a group of devices, such as the PBX/ACD, routers, gateways, interactive voice response systems, servers/hosts, etc., could perform these functions. It should also be noted that external entities, such as the ISP's, the telephone companies, cable TV companies, or other service or communications providers, could perform some of these functions and services.

CTI applications allow system integrators and application developers to custom develop the functions and features of a call center or customer care center. CTI applications are continually emerging and developing and allow the user to directly control more and more of the features of the PBX/ACD 216. Several CTI standards exist today. Possibly the most commonly used CTI standard is TAPI. TAPI supports "First Party Control", which allows a computer 221 or device 10 connected, via a network connection such as TCP/IP or Internet, to a TAPI server with CTI drivers, such as the controller 225, to perform many of the functions available to a telephone set 217, such as 5 originating/dialing telephone calls, performing call transfers, establishing multi-party conference calls, screening incoming calls, etc. TAPI also supports "Third Party Control", which allows an application (typically server-based, such as the controller 225, and with a CTI interface) to control incoming and outbound call routing, such as to designated sets of agents, to perform 10 outbound automated call campaigns, etc. Other CTI support applications are also available, such as CallPath™ from IBM, and CTCONNECT™ from Dialogic.

The portable communications device 10 has a TAPI or similar CTI support application program. Therefore, via the controller 225, the "local services", including telephony services of the main office 13, are available and the remote user has access to essentially all the capabilities and features of the PBX/ACD 216, including CTI features. This forms a virtual business communications environment which allows the user to communicate more readily and more quickly with the customer or consumer, thus rendering service to the customer or consumer on a more individualized, personal basis. "Customer Sensitivity" profiling, described in U.S. Pat. No. 5,594,791, provides a user or a business enterprise with the knowledge, control and applications necessary to treat every customer as a high priority customer by knowing his preferences, his critical concerns and issues, and by providing communications and services at a fast and personal level.

It will be appreciated from the above that the present invention provides a method and an apparatus whereby a user can remotely access the equipment and services at the user's office, regardless of where the user is currently located, and regardless of what equipment the user has at the present location of the user. The present invention also provides a method and an apparatus whereby a user can use the features of the equipment, and the services available, at the user's office, regardless of where the user is currently located, and regardless of what equipment the user has at the present location of the user.

From a reading of the description above of the preferred embodiment of the present invention, modifications and variations thereto may occur to those skilled in the art. Therefore, the scope of the present invention is to be limited only by the claims below.

I claim:

1. A method for allowing a user at a first location to control operation of devices at a second location via an electronic data network, comprising the steps of: accepting an incoming communication from the user over the electronic data network; receiving a user selection of a device over the electronic data network; receiving a user selection of a function of the device over the electronic data network; sending the user selection of the function to the device; receiving a response from the device to the device function; and sending the response to the user over the electronic data network wherein the selected device is a first device, and further comprising the steps of: monitoring the incoming communication for a user selection of a second device; and if the second device is in a different set of devices than the device, then also connecting the incoming communication to a controller for the different set of devices to control operation of the second device.

2. The method of claim 1 wherein the step of accepting the incoming communication comprises accepting the incoming communication from the user over the Internet.

3. The method of claim 1 wherein the step of receiving a user selection of a device comprises receiving the user selection of the device over the Internet.

4. The method of claim 1 wherein the step of receiving a user selection of a function comprises receiving the user selection of the function over the Internet.

5. The method of claim 1 wherein the step of sending the response to the user comprises sending the response to the user over the Internet.

6. A method for allowing a user at a first location to control operation of office devices at a second location via an electronic data network wherein the operations are onboard processing functions performed by the office device, comprising the steps of: accepting an incoming communication from the user over the electronic data network; receiving a user selection of a first office device over the electronic data network; receiving a user selection of a function of the first office device over the electronic data network; sending the user selection of the first office device function to the first office device; modifying operation instruction stored by the first office device in response the first office device function; receiving a response from the first office device to the first office device function; and sending the first office device response to the user over the electronic data network; monitoring the incoming communication for a user selection of a second office device; receiving a user selection of a second office device over the electronic data network; receiving a user selection of a function of the second office device over the electronic data network; sending the user selection of the second office device function to the second office device; receiving a response from the second office device to the second office device function; and sending the second office device response to the user over the electronic data network.

7. The method of claim 6 wherein the step of accepting the incoming communication comprises accepting the incoming communication from the user over the Internet.

8. The method of claim 6 wherein the steps of receiving a user selection of a device comprises receiving the user selection of the device over the Internet.

9. The method of claim 6 wherein the steps of receiving a user selection of a function comprises receiving the user selection of the function over the Internet.

10. The method of claim 6 wherein the step of sending the response to the user comprises sending the response to the user over the Internet.

11. A method for allowing a user at a first location to control operation of office devices at a second location via an electronic data network, comprising the steps of: accepting an incoming communication from the user over the electronic data network; receiving a user selection of a first office device over the electronic data network by a controller; receiving a user selection of a function of the first office device over the electronic data network by the controller; converting the function into a communication protocol of the first office device, sending the user selection of the first office device function to the first office device using the communication protocol of the first office device; receiving a response from the first office device to the first office device function; and sending the first office device response to the user over the electronic data network; monitoring the incoming communication for a user selection of a second office device by the controller; receiving a user selection of a second office device over the electronic data network by the controller; receiving a user selection of a function of the second office device over the electronic data network by the controller; converting the function into a communication protocol of the second office device; sending the user selection of the second office device function to the second office device using the communication protocol of the second office device; receiving a response from the second office device to the second office device function; and sending the second office device response to the user over the electronic data network.

12. The method of claim 11 wherein the step of accepting the incoming communication comprises accepting the incoming communication from the user over the Internet.

13. The method of claim 11 wherein the steps of receiving a user selection of a device comprises receiving the user selection of the device over the Internet.

14. The method of claim 11 wherein the steps of receiving a user selection of a function comprises receiving the user selection of the function over the Internet.

15. The method of claim 11 wherein the step of sending the response to the user comprises sending the response to the user over the Internet.

* * * * *